United States Patent [19]

Amagasa

[11] Patent Number: 6,107,766
[45] Date of Patent: Aug. 22, 2000

[54] METHOD OF CONTROLLING AN OPPOSED TYPE WIPER APPARATUS AND A CONTROL APPARATUS THEREOF

[75] Inventor: Toshiyuki Amagasa, Ota, Japan

[73] Assignee: Mitsuba Corporation, Gunma, Japan

[21] Appl. No.: 09/290,781

[22] Filed: Apr. 13, 1999

[30] Foreign Application Priority Data

| Apr. 22, 1998 | [JP] | Japan | 10-111894 |
| Apr. 22, 1998 | [JP] | Japan | 10-111895 |
| Apr. 22, 1998 | [JP] | Japan | 10-111896 |
| Apr. 22, 1998 | [JP] | Japan | 10-111897 |

[51] Int. Cl.$^7$ .................................................. B60S 1/08
[52] U.S. Cl. ............................ 318/443; 318/41; 318/62; 318/DIG. 2
[58] Field of Search ................... 318/34, 37, 41, 318/101, 443, 444, 53, 54, 62, 102, DIG. 2; 15/250.12, 250.13, 250.14, 250.16, 250.17

[56] References Cited

U.S. PATENT DOCUMENTS

| 4,900,995 | 2/1990 | Wainwright | 318/443 |
| 5,252,897 | 10/1993 | Porter et al. | 318/443 |
| 5,568,026 | 10/1996 | Welch | 318/443 |
| 5,860,185 | 1/1999 | Ponziani | 15/250.13 |

*Primary Examiner*—Bentsu Ro
*Attorney, Agent, or Firm*—McCormick, Paulding & Huber LLP

[57] ABSTRACT

There is provided a method for controlling an opposed wiping type wiper apparatus having a pair of wiper blades driven by a pair of motors, respectively. The wiper apparatus includes detecting means for detecting the angular position of the each wiper blade, calculating means for calculating the angular distance of one wiper blade relative to the other wiper blade, memory means for memorizing therein a reference table of target angular distances in advance for the wiper blades, and control means for controlling the pair of wiper blades so that the angular distance of each of the wiper blades is brought close to the corresponding target angular distance.

The wiper apparatus also may control the wiper blade velocity. In this case, the wiper apparatus further includes a reference table of target velocities and the wiper blades are controlled based on the target angular distance and target velocity.

16 Claims, 12 Drawing Sheets

*Fig. 5*

| angular position (pulse count) | | angular distance AS-DR |
|---|---|---|
| AS | DR | |
| 0 | 0 | 0 |
| 1 | 2 | -1 |
| 2 | 4 | -2 |
| 3 | 6 | -3 |
| 4 | 8 | -4 |
| 5 | 10 | -5 |
| 6 | 12 | -6 |
| 7 | 14 | -7 |
| 8 | 16 | -8 |
| 9 | 18 | -9 |
| 10 | 20 | -10 |
| 11 | 21 | -10 |
| 12 | 23 | -11 |
| 13 | 24 | -11 |
| 14 | 26 | -12 |
| 15 | 27 | -12 |
| 16 | 29 | -13 |
| 17 | 30 | -13 |
| 18 | 32 | -14 |
| 19 | 33 | -14 |
| 20 | 35 | -15 |
| 21 | 36 | -15 |
| 22 | 38 | -16 |
| 23 | 39 | -16 |
| 24 | 41 | -17 |
| 25 | 42 | -17 |
| 26 | 43 | -17 |
| 27 | 45 | -18 |
| 28 | 46 | -18 |
| 29 | 47 | -18 |
| 30 | 48 | -18 |

Fig. 7

| | | reference for DR-side control | | | AS | DR | reference for AS-side control | | | |
|---|---|---|---|---|---|---|---|---|---|---|
| DR | AS | distance | adjustment value (period) | target velocity (period) | | | distance | adjustment value (period) | target velocity (period) | |
| 0 | 0 | 0 | 0 | 4340 | 0 | 0 | 0 | 0 | 4340 | |
| 1 | 1 | 0 | -723 | 3617 | 1 | 2 | -1 | 2170 | 6510 | |
| 2 | 1 | 1 | 724 | 2893 | 2 | 4 | -2 | 0 | 6510 | |
| 3 | 1 | 2 | 723 | 2170 | 3 | 6 | -3 | 0 | 6510 | |
| 4 | 2 | 2 | 723 | 2893 | 4 | 8 | -4 | 0 | 6510 | |
| 5 | 2 | 3 | 724 | 3617 | 5 | 10 | -5 | 0 | 6510 | |
| 6 | 3 | 3 | -241 | 3376 | 6 | 12 | -6 | 0 | 6510 | |
| 7 | 3 | 4 | -242 | 3134 | 7 | 14 | -7 | 0 | 6510 | |
| 8 | 4 | 4 | 81 | 3215 | 8 | 16 | -8 | 0 | 6510 | |
| 9 | 4 | 5 | 80 | 3295 | 9 | 18 | -9 | 0 | 6510 | |
| 10 | 5 | 5 | -27 | 3268 | 10 | 20 | -10 | 0 | 6510 | |
| 11 | 5 | 6 | -26 | 3242 | 11 | 21 | -10 | -723 | 5787 | |
| 12 | 6 | 6 | 9 | 3251 | 12 | 23 | -11 | -724 | 5063 | |
| 13 | 6 | 7 | 8 | 3259 | 13 | 24 | -11 | 241 | 5304 | |
| 14 | 7 | 7 | -3 | 3256 | 14 | 26 | -12 | 242 | 5546 | |
| 15 | 7 | 8 | -2 | 3254 | 15 | 27 | -12 | -81 | 5465 | |
| 16 | 8 | 8 | 1 | 3255 | 16 | 29 | -13 | -80 | 5385 | |
| 17 | 8 | 9 | 0 | 3255 | 17 | 30 | -13 | 27 | 5412 | |
| 18 | 9 | 9 | 181 | 3436 | 18 | 32 | -14 | 26 | 5438 | |
| 19 | 9 | 9 | 181 | 3617 | 19 | 33 | -14 | -9 | 5429 | |
| 20 | 10 | 10 | 180 | 3797 | 20 | 35 | -15 | -8 | 5421 | |
| 21 | 10 | 10 | 361 | 3436 | 21 | 36 | -15 | 3 | 5424 | |
| 22 | 11 | 11 | -362 | 3074 | 22 | 38 | -16 | 2 | 5426 | |
| 23 | 12 | 11 | 271 | 3345 | 23 | 39 | -16 | -1 | 5425 | |
| 24 | 13 | 11 | 272 | 3617 | 24 | 41 | -17 | 0 | 5425 | |
| 25 | 13 | 12 | 271 | 3888 | 25 | 42 | -17 | -181 | 5244 | |

36d

Fig.10 (a) 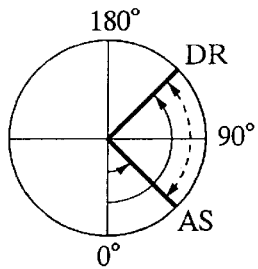 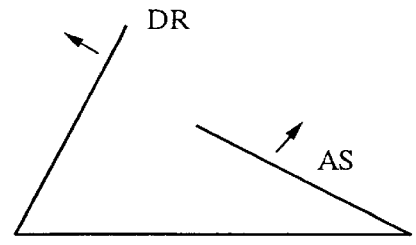
Fig.10 (b) 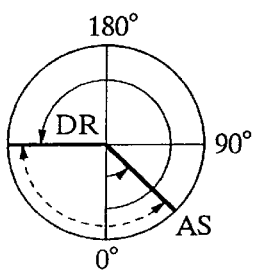 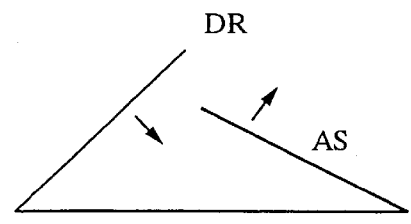
Fig.10 (c) 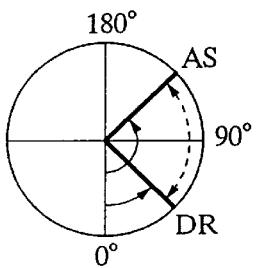 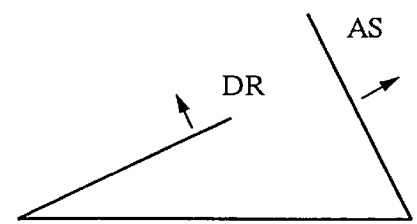
Fig.10 (d) 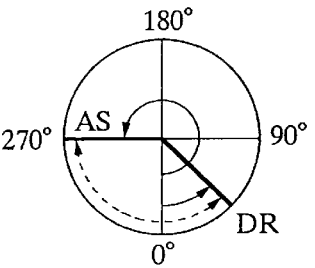 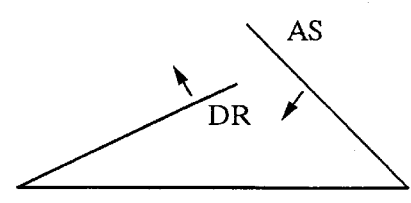
Fig.10 (e) 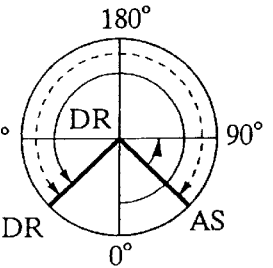 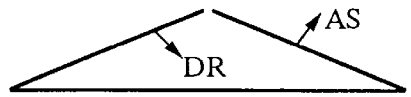

METHOD OF CONTROLLING AN OPPOSED TYPE WIPER APPARATUS AND A CONTROL APPARATUS THEREOF

BACKGROUND OF THE INVENTION

1. Field of the Invention

The present invention relates to a technology for controlling a wiper apparatus for use in a vehicle, and more particularly to a technology advantageously applied to a wiper apparatus in which a pair of wiper blades move in an opposing fashion.

2. Related Art Statement

One of the essential requirement for a wiper apparatus is to widen the wiping area to improve the view angle and view area through which a driver of a vehicle can obtain in the horizontal direction.

There are two types of controlling manners in wiper blades. One of them is a parallel type in which a pair of wiper blades are driven while keeping substantially equidistant position between the blades. The other of them is an opposing type in which the pair of wiper blades are controlled to move in an opposing fashion. That is, when one of the blades moves to the center of the front glass the other of the wiper blades also moves to the center of the front glass while one moves away from the center the other is also moves away from the center. In a wiper apparatus of the opposed wiping type, rotation centers of wiper arms are respectively positioned at left and right ends of the front glass and wiper blades move from both sides of the front glass toward the center thereof.

The wiper apparatus of the opposed wiping type may have an arrangement in which a wiper driving motor is provided at the center of the vehicle and left and right wiper blades are driven in the opposing fashion as set forth above by means of a link mechanism.

FIG. 11 is a schematic illustration of a wiper driving mechanism in which a single motor is employed for driving a pair of wiper blades in the opposing fashion. As shown in the FIG. 11, a crank arm 103 is attached to the rotation shaft of a motor 101 and an intermediate link member 104 is arranged to pivot at a middle portion thereof. An end side of the link member 104 is connected through a connection rod 105 to the crank arm 103. In this manner, the rotation of the motor 101 is converted into reciprocal swing motion of the intermediate link member 104. Further, the upper and lower end portions of the intermediate link member 104 are connected through a drive rods 106 to drive levers 108 of left and right wiper shafts 107, respectively. The left and right wiper shafts 107 extend from both side of the lower end portions of the front glass, whereby left and right wiper arms 109a, 109b are driven in the opposing fashion.

However, if only one motor is employed for driving the pair of wiper blades, the drive mechanism shall have a width equal to the whole width of a vehicle for transmitting mechanical motion from the motor to both of the wiper blades. Thus, it is inevitable that the mechanism shall have a large scale and weight. If it is requested to make the mechanism small and compact, two motors may be employed for driving the left and right wiper blades.

However, if the mechanism employs two motors for driving the left and right wiper blades, respectively, the mechanism can suffer from asynchronous motions in both of the wiper blades. The asynchronous motion is caused from difference in motor drive characteristics between the left and right motors or the motor rotational rate variations due to the loads imposed on the motors.

Moreover, it is general for the wiper apparatus of the opposing type to have an arrangement in which the wiping areas of the left and right wiper blades are normally overlapped at the center portion, or a lower return position of the front glass, so as to enlarge the whole wiping area. If the wiper apparatus is made to have such arrangement, the apparatus is more stringently required to avoid interference in the motion between the pair of blades due to the asynchronous motion of the blades. Accordingly, the motors employed in the apparatus thus arranged are more stringent required to have equal characteristics and the load variation shall be subjected to more stringent control for eliminating the interference.

In order to avoid the interference in the blade motion in the wiper apparatus set forth above, there has been mad a proposal in which the left and right motors are sequentially controlled such that after the wiper blade in the driver side (which will be referred to as DR-side hereinafter) reaches a certain angle, then the wiper blade in the assistant's seat side (which will be referred to as AS-side hereinafter) is started to be driven. In this arrangement, however, the motion of the wiper blades become awkward with this control method and hence there is a fear that the wiper blades will hinder the driver' view.

While the above-described apparatus is intended to avoid interference between the pair of blades under condition that the pair of wiper blades are driven by also pair of motors, respectively, and the wiping areas of both the blades are arranged to be overlapped at the center portion of the front glass to widen the total wiping area, a specially arranged mechanism for use with a single motor may be introduced to drive each of the blades particularly under the condition that the wiping areas of both the blades are arranged to be overlapped at the center portion of the front glass to widen the total wiping area.

FIG. 12 is a schematic illustration of an example of such mechanism for use with a single motor in which the linking ratio of the link mechanism is intentionally arranged to be very different between the left and right wiper blades, and in addition, the rotation of the motor is controlled to be constant so that interference might not occur between the wiper blades. For example, the wiper blade of the DR-side is started to move earlier from the drivers side end than the wiper blade of the AS-side. If both of the wiper blades reach the lower edge of the center portion of the front glass, then the blades go into returning motion to the respective side edges of the front glass. At that time, the blade of the DR-side is started later than the blade of the AS-side. Thus, interference between both blades can be avoided. In this arrangement, however, since the mechanical structure is arranged asymmetrical in terms of link mechanism, i.e., the left and right drive levers 106' have different lengths and the intermediate link member 104' is arranged to be asymmetric with respect to its pivot, the rigidities of the link mechanism differ at their own returning positions, causing difference in over-run amounts between both wiper blades.

While the above-described proposal is intended to overcome the problem of interference between the blade motion with a mechanism for use with a single motor, there is another proposal in which a couple of motors are again introduced for driving the couple of wiper blades, respectively. In this proposal, one wiper blade preceding in travel angle relative to the other is made to serve as master and the other wiper blade following in travel angle is made to serve as a slave. In this arrangement, for example, the wiper blade of the DR-side is made to serve the master in the wiping motion from the side to the cent of the front glass while the blade of the AS-side is mad to serve as the slave in the wiping motion from the center to the side of the front glass. In this arrangement, the wiper blade made to serve as the slave, or the following blade in each of the wiping motion, is subject to deceleration depending on how much angle the master blade has traveled relative to the slave blade.

In this method, however, there is a problem that if acceleration force is effected on only the master blade or deceleration force is effected on only the slave blade, the difference in angle between the blades of the DR and AS-sides is increased. For example, if the wiper blade in the DR-side is decelerated by wind blowing from the back to the front of the vehicle in the wiping up step, or alternatively, if the wiper blade in the AS-side is decelerated by wind blowing from the front to the back of the vehicle in the wiping down step, the angle difference will monotonously increase in this method in which only the slave blade is controlled to be decelerated.

SUMMARY OF THE INVENTION

The object of the present invention is to propose a driving method for driving left and right wiper blades smoothly without interference between the pair of blades and without unreasonable increase in the angle difference between the pair of blades.

It is another object of the present invention to provide a drive mechanism of a wiper apparatus without introducing a link mechanism in which the linking ratio of the link mechanism is intentionally arranged to be very different between the left and right wiper blades.

It is another object of the present invention to provide a method of controlling an opposed type wiper apparatus in which smooth wiping motions can be achieved while restricting variation in the wiping cycle without imposing excessive load on a control unit.

It is still another object of the present invention to provide a method of controlling an opposed type wiper apparatus in which even if the angular position difference between the left and right wiper blades becomes excessively large, the wiper blades can be swiftly controlled to have the target angular distance.

According to one aspect of the present invention, there is provided a method for controlling a wiper apparatus having a pair of wiper blades arranged to move in opposing fashion, comprising the steps of preparing a set of target distances each corresponding to every possible angular position taken by one of the wiper blades, detecting an angular position of the one wiper blade and an angular position of the opponent wiper blade, calculating the angular position distance of the one wiper blade relative to the opponent wiper blade, referring to the set of target distances to find a target distance corresponding to the detected angular position taken by the one wiper blade, controlling the one wiper blade so that the angular position of the one wiper blade is brought close to the corresponding target angular distance.

According to the above invention, one wiper blade is controlled to be close to the corresponding target angular distance. Therefore, the angular distance between the pair of wiper blades can be maintained in an appropriate state.

According to another aspect of the present invention, there is provided a method for controlling an opposed wiping type wiper apparatus having a first wiper blade driven by a first motor and a second wiper blade driven by a second motor, comprising the steps of detecting a angular position of the first wiper blade and a angular position of the second wiper blade, calculating the angle difference of the first wiper blade relative to the second wiper blade and the angle difference of the second wiper blade relative to the first wiper blade, preparing a first set of target angular distances of the first wiper blade relative to the second wiper blade, each target angular distance corresponding to every possible angular position taken by the first wiper blade, preparing a second set of target angular distances of the second wiper blade relative to the first wiper blade, each target angular distance corresponding to every possible angular position taken by the second wiper blade, controlling the first motor and the second motor so that the detected angle difference of the first wiper blade is brought close to the corresponding, target angular distance of the first wiper blade while the detected angle difference of the second wiper blade is brought close to the corresponding target angular distance of the second wiper blade.

According to the above invention, a set of the target angular distances of the first wiper blade relative to the second wiper blade is prepared for the first wiper blade while a set of target angular distances of the second wiper blade relative to the first wiper blade is prepared for the second wiper blade, and each of the wiper blades is controlled in its motion by referring to the set of target angular distances. Therefore, each of the wiper blade can be controlled independently to each other based on the target angular distances which are prepared for each of the wiper blades.

According to another aspect of the present invention, there is provided a method for controlling an opposed wiping type wiper apparatus having a first wiper blade driven by a first motor and a second wiper blade driven by a second motor, comprising the steps of detecting a angular position of the first wiper blade and a angular position of the second wiper blade, calculating the angle difference of the first wiper blade relative to the second wiper blade and the angle difference of the second wiper blade relative to the first wiper blade, preparing a first set of target angular distances of the first wiper blade relative to the second wiper blade, each target angular distance corresponding to every possible angular position taken by the first wiper blade, preparing a second set of target angular distances of the second wiper blade relative to the first wiper blade, each angle difference corresponding to every possible angular position taken by the second wiper blade, detecting a traveling velocity of the first wiper blade and a traveling velocity of the second wiper blade, calculating the average traveling velocity of the first wiper blade and the average traveling velocity of the second wiper blade, controlling the first motor and the second motor so that the detected angle difference of the first wiper blade is brought close to the corresponding target angular distance of the first wiper blade and the detected traveling velocity of the first wiper blade is brought close to the average traveling velocity of the first wiper blade while the detected angle difference of the second wiper blade is brought close to the corresponding target angular distance of the second wiper blade and the detected traveling velocity of the second wiper blade is brought close to the average traveling velocity of the second wiper blade.

According to the above invention, a set of the target angular distances of the first wiper blade relative to the second wiper blade is prepared for the first wiper blade while a set of the target angular distances of the second wiper blade relative to the first wiper blade is prepared for the second wiper blade, and each of the wiper blades is controlled in its motion by referring to the set of target angular distances. In addition, the wiper motion control in terms of traveling velocity is taken into account based on the average velocity. Therefore, each of the wiper blade can be controlled independently to each other based on average traveling velocities as well as the target angular distances which are prepared for each of the wiper blade.

According to another aspect of the present invention, there is provided a method for controlling an opposed wiping type wiper apparatus having a first wiper blade driven by a first motor and a second wiper blade driven by a second motor, comprising the steps of, detecting a angular position of the first wiper blade and a angular position of the second wiper blade, calculating the angle difference of the first wiper blade relative to the second wiper blade and the angle difference of the second wiper blade relative to the first wiper blade, preparing a first set of target angular distances of the first wiper blade relative to the second wiper blade, each angle difference corresponding to every possible angular position taken by the first wiper blade, preparing a second set of target angular distances of the second wiper blade relative to the first wiper blade, each angle difference corresponding to every possible angular position taken by the second wiper blade relative to the first wiper blade, detecting a traveling velocity of the first wiper blade and a traveling velocity of the second wiper blade, preparing a first set of target velocities for the first wiper blade, each velocity corresponding to every possible angular position taken by the first wiper blade, preparing a second set of target velocities of the second wiper blade, each velocity corresponding to every possible angular position taken by the second wiper blade, and controlling the first and second wiper blades so that the detected angle difference of the first wiper blade is brought close to the corresponding target angular distance of the first wiper blade and the traveling velocity of the first wiper blade is brought close to the target traveling velocity of the first wiper blade while the angle difference of the second wiper blade is brought close to the corresponding target angular distance of the second wiper blade and the traveling velocity of the second wiper blade is brought close to the target traveling velocity of the second wiper blade.

According to the above invention, a set of target angular distances of the first wiper blade relative to the second wiper blade is prepared for the first wiper blade while a set of the target angular distances of the second wiper blade relative to the first wiper blade is prepared for the second wiper blade, and each of the wiper blades is controlled in its motion by referring to the set of target angular distances. In addition, the wiper motion control in terms of traveling velocity is taken into account based on the independently set target velocities. Therefore, each of the wiper blade can be controlled independently to each other based on the target traveling velocities as well as the target angular distances which are prepared for each of the wiper blades.

The above-described methods may be further arranged so that the wiping motion of the wiper blades is made cyclic with a period and when the detected angle difference exceeds half the period, the detected angle difference is replaced by a newly generated angle difference that is corrected by one complete period.

According to another aspect of the present invention, there is provided a wiper apparatus having a pair of wiper blades arranged to move in opposing fashion, comprising detecting means for detecting an angular position of the one wiper blade and an angular position of the opponent wiper blade, calculating means for calculating the angular position distance of the one wiper blade relative to the opponent wiper blade, memory means for setting therein a set of target distances each corresponding to every possible angular position taken by one wiper blade, and control means for controlling the one wiper blade so that the angular position of the one wiper blade is brought close to the corresponding target angular distance.

According to the above invention, one wiper blade is controlled to be close to the corresponding target angular distance. Therefore, the distance between the pair of wiper blades can be maintained in an appropriate state.

According to another aspect of the present invention, there is provided an opposed wiping type wiper apparatus having a first wiper blade driven by a first motor and a second wiper blade driven by a second motor, comprising detecting means for detecting a angular position of the first wiper blade and a angular position of the second wiper blade, calculating means for calculating the angle difference of the first wiper blade relative to the second wiper blade and the angle difference of the second wiper blade relative to the first wiper blade, first memory means for setting therein a first set of target angular distances of the first wiper blade relative to the second wiper blade, each angle difference corresponding to every possible angular position taken by the first wiper blade, second memory means for setting therein a second set of target angular distances of the second wiper blade relative to the first wiper blade, each angle difference corresponding to every possible angular position taken by the second wiper blade, control means for controlling the first and second wiper blades so that the angle difference of the first wiper blade is brought close to the corresponding target angular distance of the first wiper blade while the angle difference of the second wiper blade is brought close to the corresponding target angular distance of the second wiper blade.

According to the above invention, a set of the target angular distances of the first wiper blade relative to the second wiper blade is prepared for the first wiper blade while a set of the target angular distances of the second wiper blade relative to the first wiper blade is prepared for the second wiper blade, and each of the wiper blades is controlled in its motion by referring to the set of target angular distances. Therefore, each of the wiper blade can be controlled independently to each other based on the target angular distances which are prepared for each one wiper blade relative to the other wiper blade.

According to another aspect of the present invention, there is provided an opposed wiping type wiper apparatus having a first wiper blade driven by a first motor and a second wiper blade driven by a second motor, comprising, first detecting means for detecting an angular position of the first wiper blade and an angular position of the second wiper blade, first calculating means for calculating the angle difference of the first wiper blade relative to the second wiper blade and the angle difference of the second wiper blade relative to the first wiper blade, first memory means for setting therein a first set of target angular distances of the first wiper blade relative to the second wiper blade, each angle difference corresponding to every possible angular position taken by the first wiper blade, second memory means for setting therein a second set of target angular distances of the second wiper blade relative to the first wiper blade, each angle difference corresponding to every possible angular position taken by the second wiper blade, second detecting means for detecting a traveling velocity of the first wiper blade and a traveling velocity of the second wiper blade, second calculating means for calculating the average traveling velocity of the first wiper blade and the average traveling velocity of the second wiper blade, and control means for controlling the first and second wiper blades so that the angle difference of the first wiper blade is brought close to the corresponding target angular distance of the first wiper blade and the traveling velocity of the first wiper blade is brought close to the average traveling velocity of =the first wiper blade while the angle difference of the second wiper blade is brought close to the corresponding target angular distance of the second wiper blade and the traveling velocity of the second wiper blade is brought close to the average traveling velocity of the second wiper blade.

According to the above invention, a set of the target angular distances of the first wiper blade relative to the second wiper blade is prepared for the first wiper blade while a set of the target angular distances of the second wiper blade relative to the first wiper blade is prepared for the second wiper blade, and each of the wiper blades is controlled in its motion by referring to the set of target angular distances. In addition, the wiper motion control in terms of traveling velocity is taken into account based on the average velocity. Therefore, each of the wiper blade can be controlled independently to each other based on the average traveling velocities as well as the target angular distances which are prepared for each of the wiper blades.

According to still another aspect of the present invention, there is provided an opposed wiping type wiper apparatus having a first wiper blade driven by a first motor and a second wiper blade driven by a second motor, comprising first detecting means for detecting a angular position of the first wiper blade and a angular position of the second wiper blade, first calculating means for calculating the angle difference of the first wiper blade relative to the second wiper blade and the angle difference of the second wiper blade relative to the first wiper blade, first memory means for setting therein a first set of target angular distances of the first wiper blade relative to the second wiper blade, each angle difference corresponding to every possible angular position taken by the first wiper blade, second memory means for setting therein a second set of target angular distances of the second wiper blade relative to the first wiper blade, each angle difference corresponding to every possible angular position taken by the second wiper blade, second detecting means for detecting a traveling velocity of the first wiper blade and a traveling velocity of the second wiper blade, third memory means for setting therein a first set of target velocities for the first wiper blade, each velocity corresponding to every possible angular position taken by the first wiper blade, fourth memory means for setting therein a second set of target velocities for the second wiper blade, each velocity corresponding to every possible angular position taken by the second wiper blade, and control means for controlling the first and second wiper blades so that the angle difference of the first wiper blade is brought close to the corresponding target angular distance of the first wiper blade and the traveling velocity of the first wiper blade is brought close to the target traveling velocity of the first wiper blade while the angle difference of the second wiper blade is brought close to the corresponding target angular distance of the second wiper blade and the traveling velocity of the second wiper blade is brought close to the target traveling velocity of the second wiper blade.

According to the above invention, a set of the target angular distances of the first wiper blade relative to the second wiper blade is prepared for the first wiper blade while a set of the target angular distances of the second wiper blade relative to the first wiper blade is prepared for the second wiper blade, and each of the wiper blades is controlled in its motion by referring to the set of target angular distances. In addition, the wiper motion control in terms of traveling velocity is taken into account based on the independently set target velocities. Therefore, each of the wiper blade can be controlled independently to each other based on the target traveling velocities as well as the target angular distances which are prepared for each of the wiper blades.

The above-described apparatus may be further arranged so that the wiping motion of the wiper blades is made cyclic with a period and when the detected angle difference exceeds half the period, the detected angle difference is replaced by a newly generated angle difference that is corrected by one complete period.

The above-described objects and other objects, and novel feature of the present invention will become apparent more fully from the description of the following specification in conjunction with the accompanying drawings.

BRIEF DESCRIPTION OF THE DRAWINGS

FIG. 5 shows a target angular distance reference table in which there are stored a set of target angular distances useful for controlling the wiper blade of the AS-side;

FIG. 7 is a control data reference table in which there are stored data of the DR-side target angular distance, AS-side target angular distance, DR-side target velocities, and AS-side target velocities;

FIG. 10 is a set of diagrams each showing an example of rotation stage of motors and corresponding location of the wiper blades, wherein;

FIG. 10(a) shows a state where the blade of the DR-side precedes by 90° from the blade of the AS-side;

FIG. 10(b) shows a state where the blade of the DR-side precedes by 225° from the blade in the AS-side;

FIG. 10(c) shows a state where the blade of the AS-side precedes by 90° from the blade of the DR-side;

FIG. 10(d) shows a state where the blade of the AS-side precedes by 225° from the blade of the DR-side;

FIG. 10(e) shows a state where the blade of the DR-side precedes by 270° from the blade of the AS-side;

DETAILED DESCRIPTION OF THE INVENTION

Figure 1:
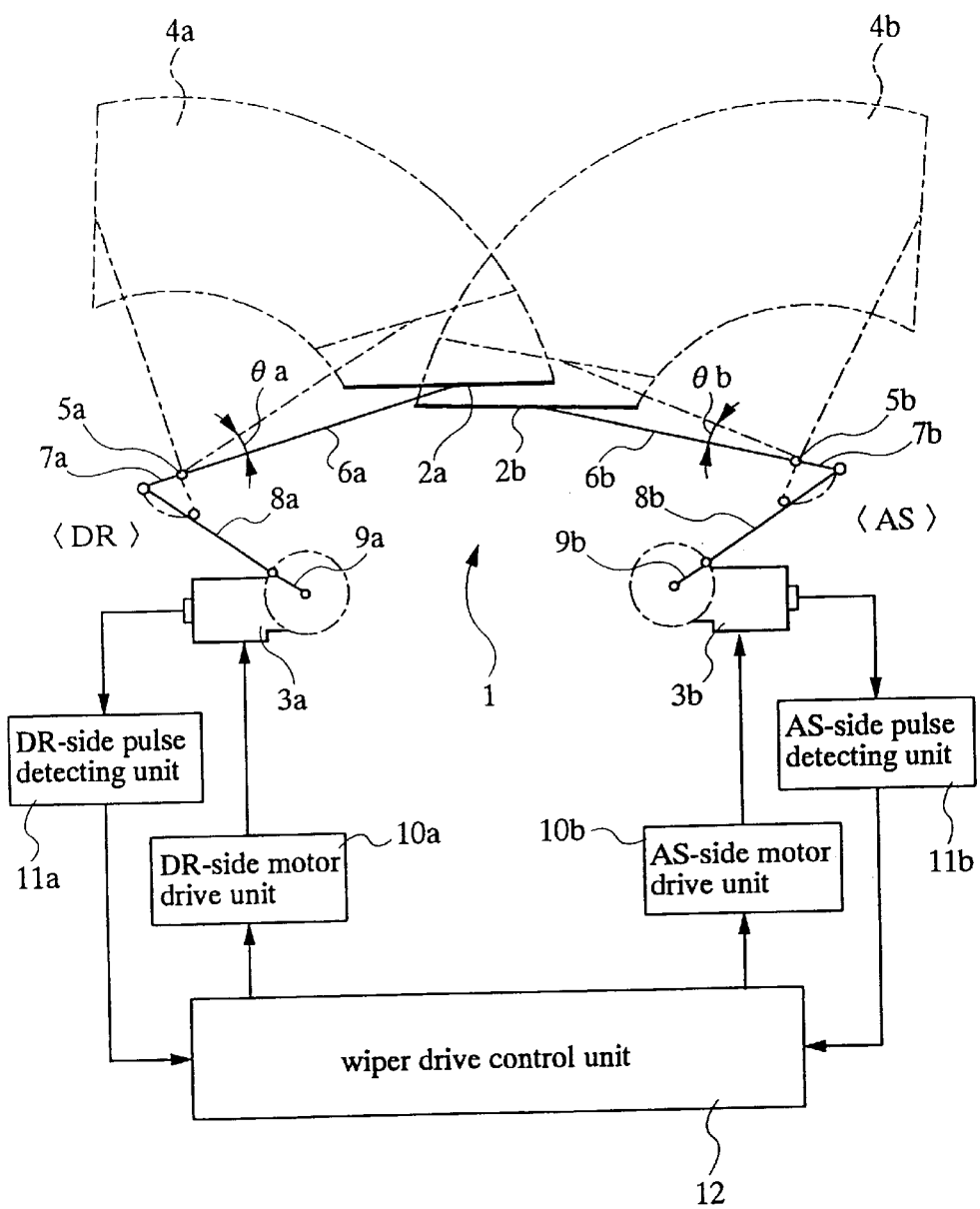
FIG. 1 is a schematic illustration of the structure of an opposed type wiper apparatus according to the present invention.

Embodiments of the present invention will hereinafter be described in detail with reference to the accompanying drawings. FIG. 1 is a schematic illustration useful for explaining the structure of the opposed wiping type wiper apparatus and the control system thereof.

In FIG. 1, reference numeral 1 depicts a wiper apparatus adaptable to the wiper control method according to the present invention. The wiper apparatus 1 is arranged to wipe a front glass of a vehicle in a so-called opposite fashion in which DR-side wiper blade and AS-side wiper blade are constantly moved in directions opposite to one another. Further, the DR-side wiper blade (as a first wiper blade) 2a and a AS-side wiper blade (as a second wiper blade) 2b (which will be hereinafter referred to as wiper blades 2a and 2b) are driven so that the respective wiping areas overlap each other at their center returning positions. In this wiper apparatus 1, a DR-side motor (as a first motor) 3a and a AS-side motor (as a second motor) 3b (which will be referred to as only motors 3a and 3b) are provided to drive the first wiper blade and the second wiper blade, respectively. Further, they are independently controlled based on the position data (representing angular positions θa and θb) of the wiper blades 2a and 2b. The motor rotation angles, or the angles θa and θb are measured with respect to the lower return position. It should be noted that "a" and "b" attached to reference numerals of corresponding elements represent that the elements with "a" and "b" relate to the DR-side and the AS-side, respectively.

The wiper blades 2a and 2b are attached with blade rubber members (not shown) so that the blade rubber members assure intimate contact of the wiper blades with the front glass of a vehicle, whereby water drops or the like will be wiped out from wiping areas 4a and 4b depicted with one-dot-chain lines in FIG. 1. The wiper blades 2a and 2b are supported on wiper arms 6a and 6b, and the wiper arms 6a and 6b are driven to pivot about wiper shafts 5a and 5b, respectively, so that a fan-shaped wiping areas are formed. The wiper arm 6a, 6b and a drive lever 7a, 7b are connected to each other by way of the wiper shaft 5a, 5b in an opposing fashion. A connection rod 8a, 8b is attached to one end of the drive lever 7a, 7b. The other end of the connection rod 8a, 8b is connected to one end of a crank arm 9a, 9b which is rotated by the motor 3a, 3b. Further, as the motor 3a, 3b rotates, the crank arm 9a, 9b rotates, making the drive lever 7a, 7b swingably move. Thus, rotation of the motor 3a, 3b is converted into swing motion of the wiper arm 6a, 6b.

The motors 3a and 3b are driven by separate drive circuits, e.g., a DR-side motor drive unit 10a and a AS-side motor drive unit 10b, respectively. In addition, the motor 3a, 3b is connected with a DR-side pulse detector 11a, a AS-side pulse detector 11b, which serves as pulse detection means using a rotary encoder, so that the rotation angles of the wiper arm can be detected. In this case, the motor drive unit 10a, 10b is controlled by a wiper drive control unit 12 and detection values from each of the pulse detectors 11a and 11b are supplied to the wiper drive control unit 12.

Figure 2:
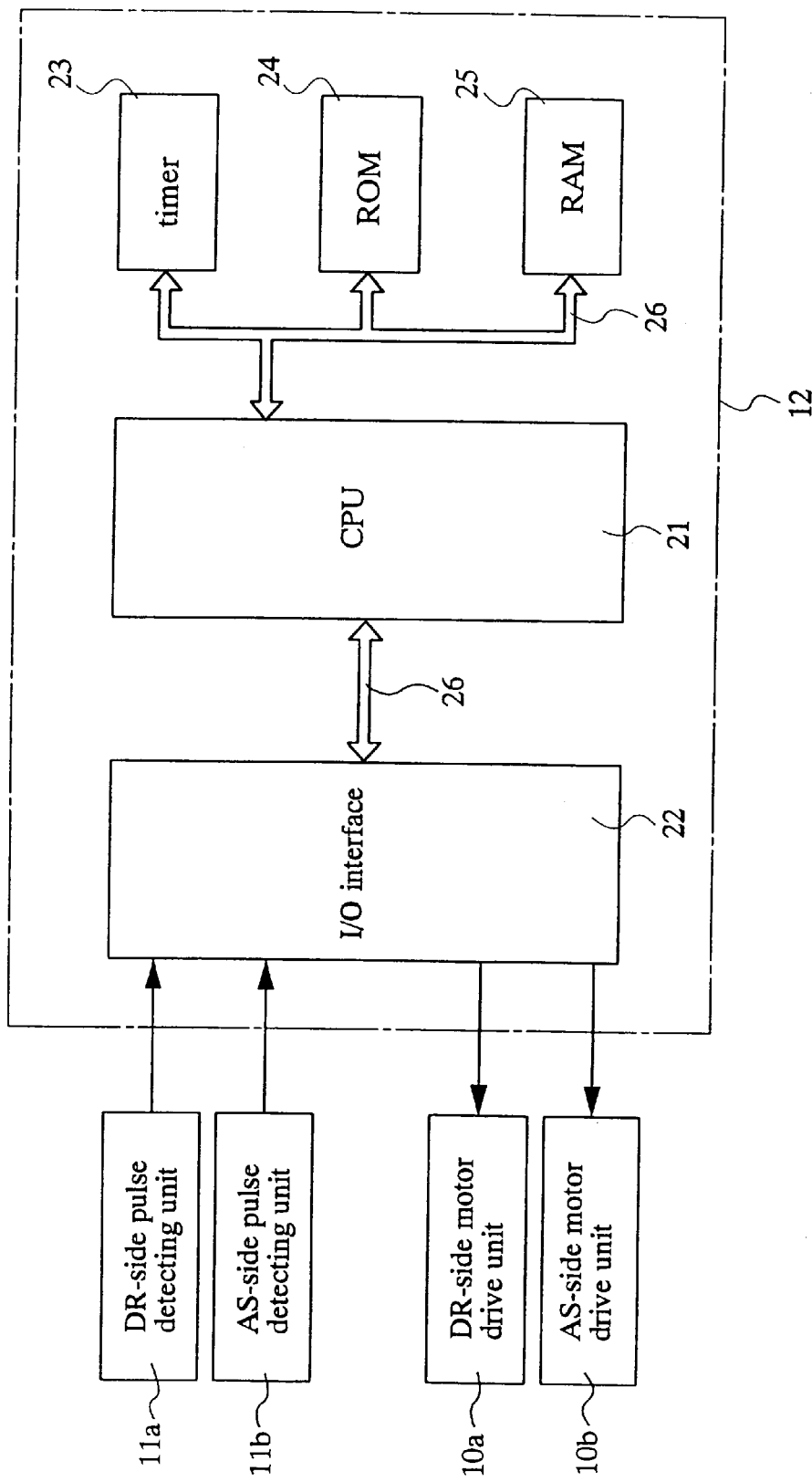
FIG. 2 is a block diagram showing the circuit configuration of a wiper drive control unit useful for controlling the wiper apparatus shown in FIG. 1.

FIG. 2 is a block diagram showing the circuit configuration of the wiper drive control unit 12 as an embodiment of the present invention. As shown in FIG. 2, the wiper drive control unit 12 is comprised of a microcomputer and peripheral circuits thereof. In the microcomputer, an I/O interface 22, a timer 23, a ROM 24, and a RAM 25 are connected with each other through a bus line 26 extending radially from a CPU 21. Signals from the pulse detectors 11a and 11b are processed and control signals are supplied to the motor drive unit 10a and 10b, respectively.

The I/O interface 22 is connected with the DR-side pulse detector 11a, AS-side pulse detector 11b, DR-side motor drive unit 10a, and AS-side motor drive unit 10b. Control programs and fixed data for various controls are stored in the ROM 24. RAM 25 stores data of output signal which are subject to data processing useful for supplying the motor drive units 10a and 10b, and data calculated by the CPU 21. Further, the CPU 21 executes drive control of the wiper apparatus 1 in accordance with the control programs stored in the ROM 24.

Figure 3:
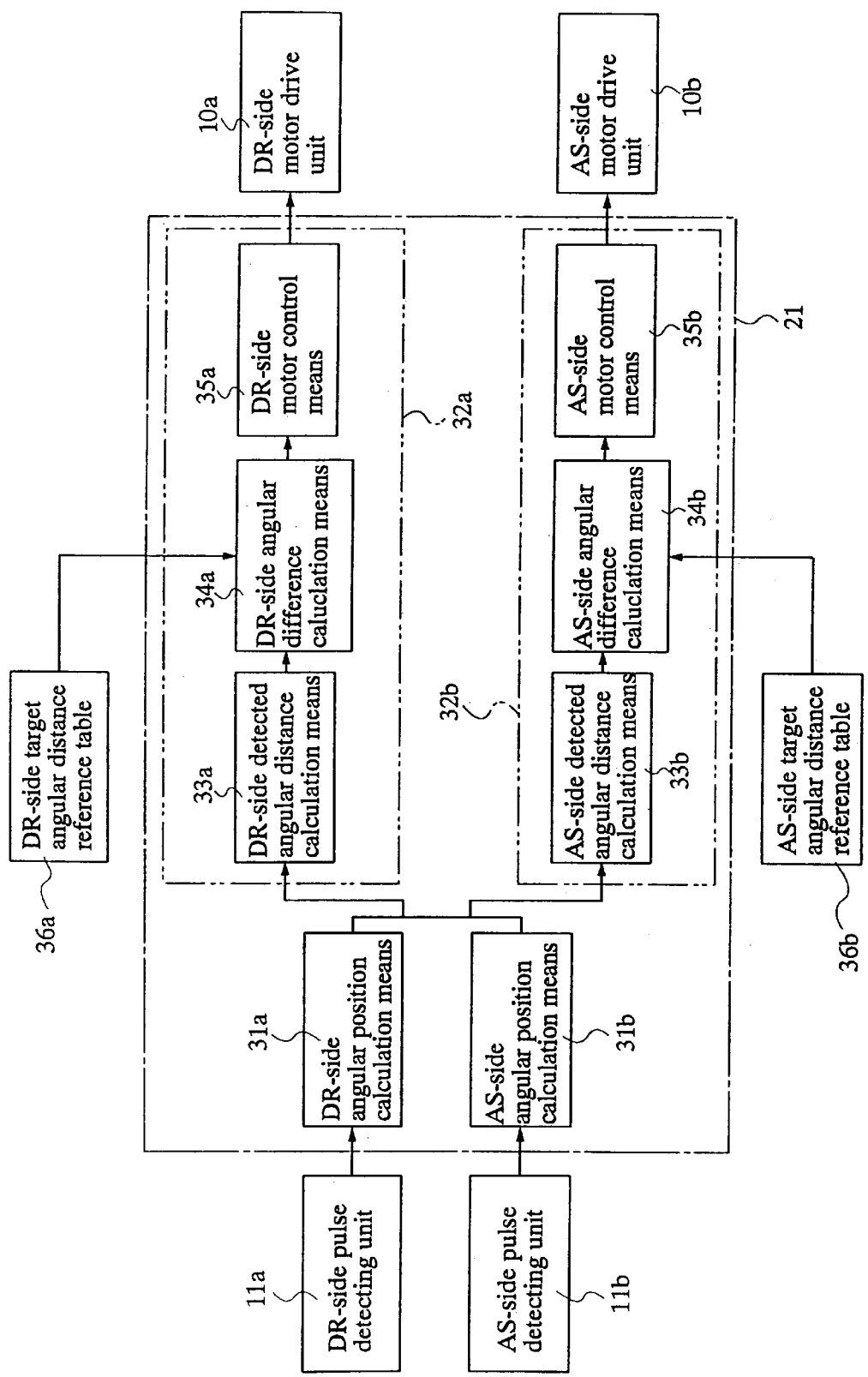
FIG. 3 is a diagram showing in a block form the function of a CPU according to the first embodiment of the present invention.

FIG. 3 is a block diagram showing an arrangement of the main function of the CPU 21 as the first embodiment of the present invention. The method for controlling the wiper apparatus according to the present invention will hereinafter be explained below with reference to FIG. 3 which shows the function of the CPU 21, including the processing steps of the method.

As shown in FIG. 3, the CPU 21 includes a DR-side angular position calculation means (as a first wiper blade angular position calculation means) 31a and a AS-side angular position calculation means (as a second wiper blade angular position calculation means) 31b for calculating the current angular positions θa and θb of the wiper blades 2a and 2b, based on pulses supplied from the DR-side pulse detector 11a and the AS-side pulse detector 11b. The CPU 21 also includes a DR-side motor control means 32a and a AS-side motor control means 32b. The DR-side motor control means 32a and the AS-side motor control means 32b calculate control outputs useful for controlling the motors 3a and 3b based on the angular positions of the wiper blades and supply the outputs to the motor drive units 10a and 10b.

In this case, the angular position calculation means 31a and 31b calculate the current angular positions of the wiper blades 2a and 2b by accumulating the pulses supplied from the pulse detectors 11a and 11b. Note that the CPU 21 directly deals with the pulse accumulation counts as the angular positions, and the following processing is carried out based on the pulse counts. However, the following processing may be carried out under the condition that the relationship between the pulse counts and the angular positions θa and θb (deg) is previously stored in a form of a reference table or the like in the ROM 24. In addition, since one revolution (360°) of the motor corresponds to one cyclic motion of the wiper arm, the rotation angles of the motors 3a and 3b may be obtained from the pulse accumulation counts and may then be dealt with as angular positions x° and the following processing may be then carried out. The following processing may be carried out based on these angular positions.

Also, in the CPU 21, the motor control means 32a and 32b include a DR-side detected angular position calculation means 33a (as a first wiper blade detected angular distance calculation means) and a AS-side detected angular distance calculation means 33b (as a second wiper blade detected angular distance calculation means), respectively. The DR-side detected angular position calculation means 33a (as a first wiper blade detected angular position calculation means) is utilized for calculating an actual angular position distance between the wiper blades 2a and 2b observed from the situation of each of the DR-side and AS-side, based on the current angular positions of the wiper blades 2a and 2b, correcting the values upon necessity, and calculating the DR-side detected angular difference. The AS-side detected angular distance calculation means 33b (as a second wiper blade detected angular distance calculation means) also is utilized for calculating the AS-side detected angular distance, in a similar manner.

In this case, the detected angular distance of the DR-side is defined as an angular distance measured from the DR-side relative to the AS-side, while the detected angular distance of the AS-side is defined as a detected angular distance measured from the AS-side relative to the DR-side. For example, if the DR-side wiper blade is position at the angular position of "10" pulses (equivalent to 20° in rotation angle degree of the motor 3a) while the AS-side wiper blade 2b is positioned at the angular position of "3" pulses, the DR-side detected angle difference (or the first wiper blade detected angular distance) is "+7" by subtracting the angular position in the AS-side from the angular position in the DR-side (10–3). On the other hand as viewed from the AS-side, the AS-side detected angular distance (or the second wiper blade detected angular distance) in this situation is "–7" by subtracting the AS-side detected angular distance (or the second wiper blade detected angular distance) from the angular position of the AS-side wiper blade 2b as a reference.

Next, in the downstream of the detected angular distance calculation means 33a and 33a, respectively, there are provided a DR-side angular difference calculation means 34a (as a first wiper blade angular difference calculation means) and a AS-side angular difference calculation means (as a second wiper blade angular difference calculation means). Each of them calculates angular difference representing the difference between the detected angle difference and the target angular distance at the present time point by comparing the target angular distance as a target value of the angular position distance between both the wiper blades 2a and 2b, with the detected angular distance obtained previously.

Figure 4:
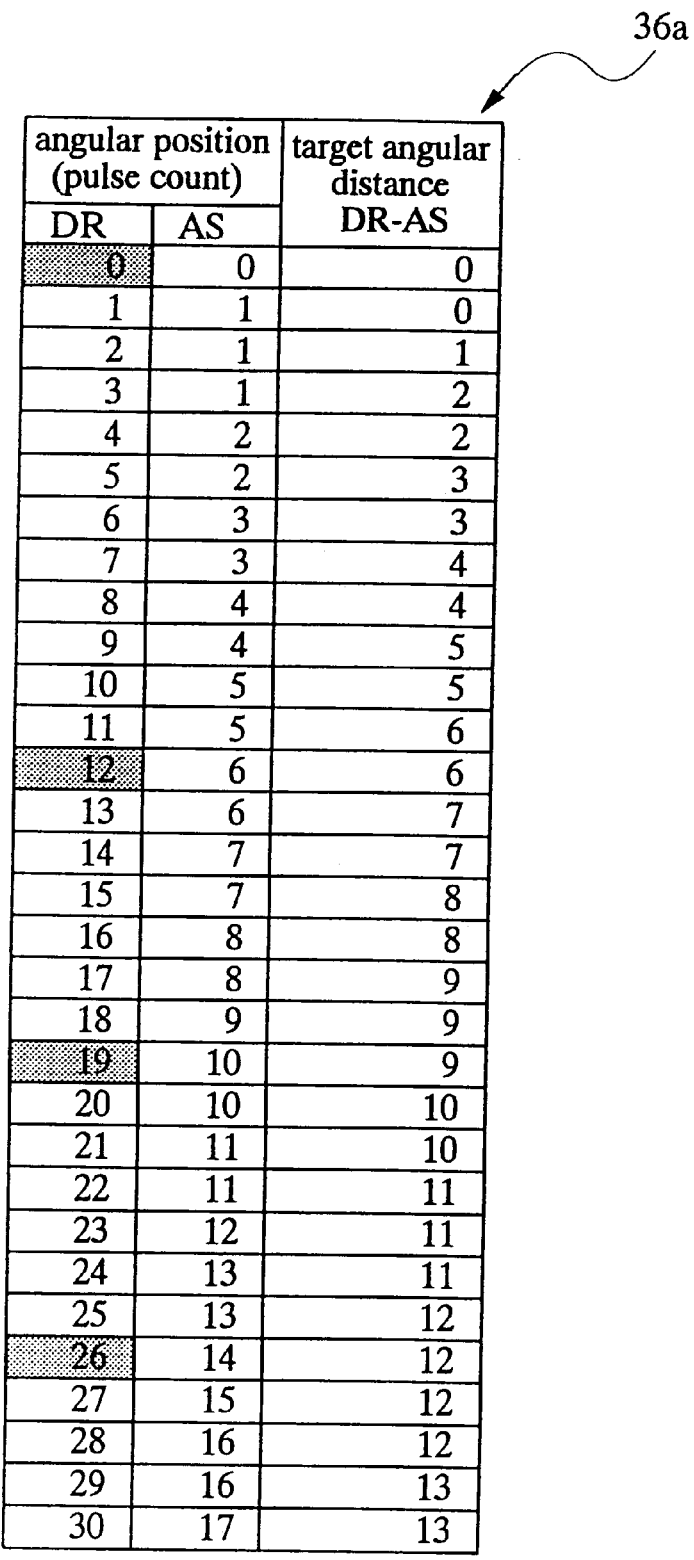
FIG. 4 shows a target angular distance reference table in which there are stored a set of target angular distances useful for controlling the wiper blade of the DR-side.

The target angular distance utilized for comparison with the detected angular distance is read from each of a DR-side target distance reference table 36a and a AS-side target angular distance reference table 36b which are prepared in the ROM 24. FIGS. 4 and 5 show the structure of these reference tables. FIG. 4 shows the DR-side target angular distance reference table 36a containing target angular distances (or first wiper blade target angular distances) in relation to the angular position in the DR-side as a reference. FIG. 5 shows the DR-side target angular distance reference table 36a containing target angular distances (or second wiper blade target angular distances) in relation to the angular position in the AS-side as a reference.

In this case, for example, it will be found from the DR-side target angular distance reference table 36a in FIG. 4 that when the angular position in the DR-side is "10" pulses and corresponding target angular distance of the AS-side is "5" pulses, which requests that the target angular distance between both sides is "+5". If data of "DR=10, AS=7" is obtained and actual detected angular distance is found to be "+3", as in the above example, the DR-side angular difference calculation means 34a carries out arithmetic operation of ((+5)–(+3)) to determine that the DR-side angular difference (or first wiper blade angular difference) of "+2". This data represents a state that the wiper blade of the AS-side precedes by "2" pulses amount relative to the target angular distance, as viewed from the DR-side wiper blade (i.e., the blade in the AS-side is excessively coming close to the DR-side).

By contrast, as will be understood from the AS-side target angular distance reference table 36b shown in FIG. 5 when the angular position in the AS-side is "7" pulses in the case of the above example (where DR=10, AS=7), the angular position target in the DR-side is "14" pulses and the target angular distance between both sides is "–7". In this respect, since the detected angular distance is "–3" (7–10) in the above example, the AS-side angular difference calculation means 34b calculates AS-side angular difference (second wiper blade angular difference) of "–4" ((–7)–(–3)) with respect to the target angular distance. This data represents that the wiper blade in the DR-side is delayed "4" pulses relative to the target angular distance, viewed from the following wiper blade in the AS-side (i.e., the blade in the DR-side is coming close to the other).

Meanwhile, in each of the target angular distance reference tables 36a and 27a, the data distribution of pulses concerning the follower side is rougher then the leading side. This is because control for the follower side blade must be much finer than for the leading wiper blade in order to control the wiper blades such that the following wiper blade might not collide with the leading one. In this time, pulse division for the leading side may be coarse. To see the pulse division in the reference tables, for example the target angular distance in the AS-side is 1 pulse while the target angular distance in the DR-side ranges from 1 to 3 pulses in FIG. 4. The target angular distance in the AS-side is set to shift like steps. In other words, the wiper blade in the DR-side moves by 3 pulses while the following AS-side moves one pulse, and the data for the DR-side is arranged to be coarse accordingly. In FIG. 5, the target value is set such that the blade in the DR-side moves forward by two pulses while the blade in the AS-side moves by 2 pulses at the initial motion. This means that the DR-side wiper blade moves by two pulses in response to the motion of the following AS-side wiper blade by 1 pulse, an thus, the data for the leading DR-side is coarse as described above.

Therefore, in some cases, there is difference in the control configurations between both sides even if the angular positions in the DR-side and the AS-side are identical to each other. For example, when angular position data of "DR=3, AS=1" is obtained, the DR-side detected angular distance "2" (3–1) is equal to the target angular distance "2" according to FIG. 4, and therefore, the data is taken as OK. However, referring to FIG. 5, the target angular distance is "–1" with respect to "AS=1", and the detected angular distance of "–2" (1–3) is therefore NG in this case. Consequently, normal control is carried out in the DR-side while the following control is carried out in the DR-side to recover a delay.

In the wiper apparatus 1, the leading side and the follower side are exchanged at an upper return position as the boundary. That is, in the returning way, the AS-side leads the DR-side. Accordingly, in the target angular distance reference tables 36a and 36b, the wiper blade in the AS-side leads after pulses 124 beyond pulses 90 although not shown in the figures. Note that the reference tables shown in FIGS. 4 and 5 are merely examples and the formats and values of the reference tables are naturally not limited thereto.

Thus, in the wiper control apparatus according to the present invention, the DR-side and the AS-side are respectively provided with reference tables which include a set of data corresponding to each other, and each of the wiper blades 2a and 2b having different moving velocities is controlled so as to take into account the angular positions of its own and that of the other. Therefore, upon input of a pulse to one of the sides from the motor 3a or 3b, control is started for both the motors 3a and 3b.

Meanwhile, in the rear stages behind the angular difference calculation means 34a and 34b, there are provided a DR-side motor control means 35a (as a first motor control means) and a AS-side motor control means (as a second motor control means 35b (as a second motor control means) for calculating and determining the outputs of the motors 31 and 3b based on the obtained angular difference, respectively. Here, the outputs of the motors 3a and 3b which reduce the difference between the target angular distance and the detected angular distance are calculated and supplied to the motor drive units 10a and 10b.

Specifically, according to the example described above the DR-side motor control means 35a obtains a value "+2" as DR-side angular difference and calculates a subsequent output of the DR-side motor 3a, based on the value. In this case, it is recognized from the obtained angular difference that the wiper blade in the AS-side is brought close to by "2" pulses than the target value. According to this recognition, a higher output (or rotation velocity) than at present is calculated for the DR-side in order that the angular position distance is widened to approach the target value. Further, to realize this output, a control signal is supplied to the DR-side motor drive unit 10a.

In the AS-side motor control means 35b, according to the example described above, the means 35b obtains a value "–4" as AS-side angular difference and calculates a subsequent output of the AS-side motor 3b, based on the value. In this case, it is recognized from the obtained angular difference that the wiper blade in the DR-side is brought close to by "4" pulses than the target value. According to this recognition, a lower output (or rotation velocity) than at present is calculated for the AS-side in order that the angular position distance is widened to approach the target value. Further, to realize this output, a control signal is supplied to the AS-side motor drive unit 10b.

Thus, in the wiper control apparatus according to the present invention, each of the motors 3a and 3b is independently controlled such that the detected angular distance between the wiper blades 2a and 2b approaches the target angular distance. That is, when the angular position distance between both wiper blades 2a and 2b becomes smaller than the target value (or they have come close to each other), the output in the leading side is increased while the output in the follower side is decreased to reduce the difference from the target angular distance. In addition, when the angular position difference becomes larger than the target (or the blades have come to be apart from each other), the output in the leading side is decreased while the output in the follower side is increased to reduce the difference from the target angular distance. Therefore, if a change occurs in the angular position distance between the wiper blades 2a and 2b, the outputs of both motors 3a and 3b can be changed successively in correspondence with the change, and therefore, the outputs of both motors 3a and 3b can be rapidly converged to the target angular distance distance indicated in the target angular distance reference tables. Accordingly, it is possible to reduce the change of the angular position distance between the wiper blades 2a and 2b.

Although the target angular distance reference tables explained above are separate respectively for the DR-side and the AS-side, it is possible to use such a reference table which combines together the reference tables shown in FIGS. 4 and 5. When the angular position distance between the wiper blades 2a and 2b is enhanced to be equal to or higher than a certain reference value, one of the blades may be stopped to converge the angular position distance.

According to the first embodiment of the present invention, when the detected angular distance deviates from the target angular distance, the motors in the DR-side and the AS-side are independently controlled to reduce the difference from the target angular distance. As a result, the angular position distance between the wiper blades is converged to a value indicated in a target angular distance reference table. Accordingly, the left and right wiper blades can be driven smoothly while restricting variance of the angular position distance of the wiper blades due to changes of external loads, without intentionally changing the link ratio of the link mechanism.

Next explanation will be made of a system as a second embodiment of the present invention, in which the wiper blades 2a and 2b are controlled in consideration of their velocities in addition to their angular positions. Note that the same portions as those in FIG. 1 will be referred to by the same reference symbols and thus they are not described.

Figure 6:
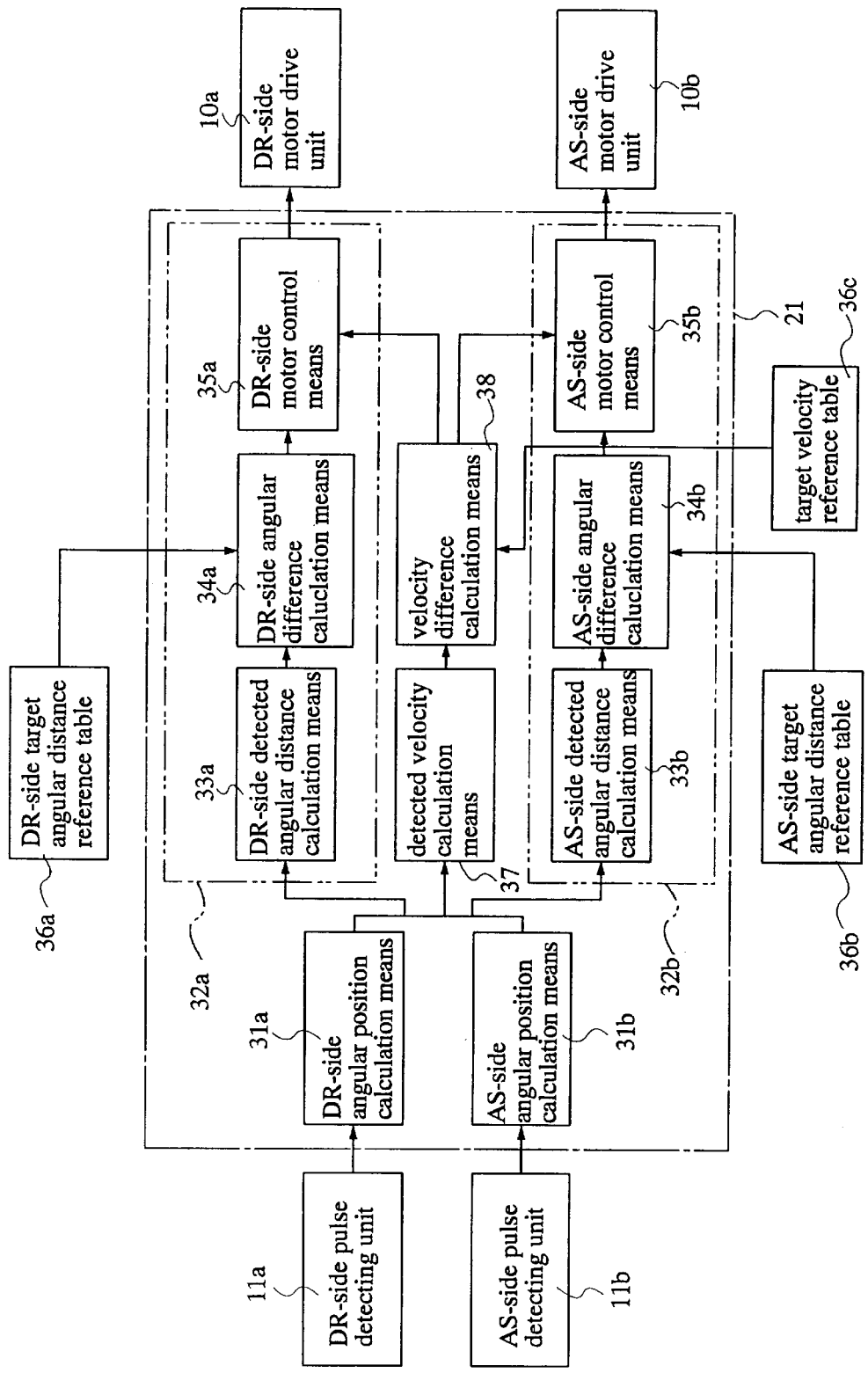
FIG. 6 is a diagram showing in a block form the function of a CPU according to the second embodiment of the present invention.

In addition to data concerning the angular positions, the CPU 21 takes into account the velocitys of the wiper blades 2a and 2b for carrying out the wiper control. FIG. 6 is a block diagram showing the configuration of the CPU 21 as the second embodiment of the present invention. The CPU 21 is provided with a wiper blade detected velocity calculation means 37 and a velocity difference calculation means 38 in addition to the motor control means 32a and 32b, as shown in FIG. 6.

The wiper blade detected velocity calculation means 37 functions to calculate the actual velocity of the wiper blades 2a and 2b at present and obtains the velocity of the wiper blades 2a and 2b by regarding the velocity as the time required for the blades to move 1 pulse, i.e., the necessary time per pulse. Firstly, the wiper blade detected velocity calculation means 37 obtains the angular positions of the wiper blades 2a and 2b from the angular position calculation means 31a and 31b. Next, based on the obtained angular positions and the clock counting by the timer 23, the necessary time per pulse of the wiper blades 2a and 2b is calculated. At this time, the CPU 21 takes the average value of the velocitys of the wiper blades 2a and 2b, as the detected velocity. However, either one of the velocitys of the wiper blades 2a and 2b may be selected as a representative value. Further, this is supplied as the detected velocity of the wiper blades to the velocity difference calculation means 38 in the next stage.

Subsequently, the velocity difference calculation means 38 compares the detected velocity of the wiper blades with the target velocity of the wiper blades stored in advance in the ROM 24, to prepare velocity difference data. In this case, the target velocity of the wiper blade is obtained by dividing the average value T of the wiping cycles of the wiper blades 2a and 2b by the total pulse number P of the pulses required for one wiping motion and corresponds to the average time T/P per pulse. Further, the velocity difference calculation means 38 obtains the difference between the target velocity and the detected velocity of the wiper blades, to prepare velocity difference data indicating the difference therebetween. Note that various values are set as the target velocity, depending on the operation mode of the wiper such as LOW, HIGH, and the like. In the mode of HIGH, the target velocity is set to a value obtained by multiplying the value in the LOW mode by a constant value.

Meanwhile, in the rear stage of the angular difference calculation means 34a and 34b and the velocity difference calculation means 38, there are provided a DR-side motor control means (as a first motor control means) and a AS-side motor control means (as a second motor control means) for calculating and determining the outputs of the motors 3a and 3b based on the obtained angular difference and the velocity difference data, in a similar manner described with reference to FIG. 3. Here, the outputs of the motors 3a and 3b, which reduce the difference between the target angular distance and the detected angular distance and also the difference between the target velocity and the detected velocity, are calculated and are instructed to the motor drive units 10a and 10b. At this time, an equal value is used as velocity difference data for both motors 3a and 3b, although those values that are respectively calculated in the DR-side and the AS-side based on the DR-side target angular distance reference table 36a and the AS-side target angular distance reference table 36b stored in the ROM 24 are used as angle distance data.

Specifically, according to the example described before, the DR-side motor control means 35a firstly obtains a value "+2" as DR-side angular difference and calculates a subsequent output of the DR-side motor 3a, by adding the velocity difference data to the obtained value. Therefore, the new output of the motor 3a is expressed in form of a relation "new output=ax(target angular distance−detected value distance)+bx(target velocity−detected velocity) where a and b are coefficients". In this case, as for the angle distance, it is recognized from the obtained angular difference that the wiper blade in the AS-side is closer by "2" pulses than the target value. According to this recognition, a higher output (or rotation velocity) than at present is calculated for the DR-side in order that the angular position distance is widened to approach the target value. Further, to realize this output, a control signal is supplied to the DR-side motor drive unit 10a.

In the AS-side motor control means 35b, according to the example described above, the means 35b obtains a value "−4" as AS-side angular difference and calculates a subsequent output of the AS-side motor 3b, based on this obtained value and the velocity difference data. In this case, as for the angle distance, it is recognized from the obtained angular difference that the wiper blade in the DR-side is closer by "4" pulses than the target value. According to this recognition, a lower output (or rotation velocity) than at present is calculated for the AS-side in order that the angular position distance is widened to approach the target value. Further, to realize this output a control signal is supplied to the AS-side motor drive unit 10b.

Thus, in the wiper control apparatus according to the present invention, each of the motors 3a and 3b is independently controlled such that the detected angular distance between the wiper blades 2a and 2b approaches the target angular distance, by executing wiper control with monitoring changes of the velocity in addition to changes of the angle difference. Besides, both motors 3a and 3b are controlled such that the detected velocity of the wiper blades 2a and 2b approaches the target velocity.

Specifically, when the angular position distance between both wiper blades 2a and 2b becomes smaller than the target value (or they have come close to each other), the output in the leading side is increased while the output in the follower side is decreased to reduce the difference from the target angular distance, like in the example described above. In addition, when the angular position distance has come to be larger than the target (or the blades have come to be apart from each other), the output in the leading side is decreased while the output in the follower side is increased to reduce the difference from the target angular distance. Further, when the velocity of the wiper blades 2a and 2b is higher than the target velocity, the outputs of the motors 3a and 3b are increased, and when the velocity of the blades is lower than the target velocity, the outputs of the motors 3a and 3b are decreased.

Therefore, even if a change occurs in the angular position distance between the wiper blades 2a and 2b, the outputs of both motors 3a and 3b can be changed successively in correspondence with the change, and therefore, the angular position distance can be rapidly converged to the target angular distance distance indicated in the target angular distance reference table. Accordingly, it is possible to reduce the variance of the angular position distance between the wiper blades 2a and 2b. In addition, since the outputs of the motors 3a and 3b can be changed based on the velocity difference data, changes of velocity due to changes of external loads can be restricted.

As for the velocity difference data, a predetermined threshold value may be provided for the difference between the target velocity and the detected velocity, and the velocity difference data may be related to the motor output control only when the difference exceeds the threshold value. In addition, the velocity difference data need not always be the average value between the DR-side and the AS-side but may be calculated individually for each of the DR-side and AS-side so that the motors 3a and 3b can be controlled individually. Further, the average value T of wiping cycles may be directly used as the target velocity and may be compared with the detected cycle period of the wiper blades Thus, according to the second embodiment of the present invention, motions of the wiper blades are controlled by considering not only changes of the angle distance between the wiper blades but also changes of the velocity of the wiper blades. It is therefore possible to restrict not only the variance of the angle distance due to changes of external loads but also the changes of the velocity. Accordingly, even when an equal load is applied to each of the left and right wiper blades or wiper arms, a desired wiping velocity can be maintained so that the wiping cycle of the wiper blade is prevented from being changed.

Further, explanation will be made of a system as a third embodiment of the present invention, in which a target velocity for the wiper blades 2a and 2b is set for every angular position and the wiper blades 2a and 2b are controlled while comparing the detected velocity and the target velocity in addition to the angular positions. Also, in this embodiment, those portions which are the same as those in the first and second embodiments are referred to by same reference symbols and explanation thereof will be omitted herefrom.

In the third embodiment, every target angular distance as a comparative object is read from a control data reference table 36c previously stored in the ROM 24. FIG. 7 shows a part of the control data reference table 36c. In FIG. 7, the reference table stores target angular distances (as first wiper blade target angular distances) in relation to the angular positions in the DR-side as references, target angular distances (as second wiper blade target angular distances) with respect to angular positions in the AS-side as references, and target velocities of both the wiper blades 2a and 2b as, described later.

As can be seen from the control data reference table 36c in FIG. 7, if the angular position is counted with respect to the DR-side, the angular position of 10 pulse amount corresponds to 5 pulse amount of the AS-side wiper blade, which means +5 pulse amount is a target position angle distance. Therefore, for example, if there is obtained a set of detected angular position, "DR=10, AS=7", and hence the detected angular distance is "+3", the DR-side angular difference calculation means 34a carries out an arithmetic operation of "+2" ((+5)−(+3)), which is utilized for DR-side angular difference data. This data represents a state that the wiper blade in the AS-side precedes by "2" pulses relative to the target angular distance, as viewed from the leading DR-side wiper blade (i.e., the AS-side blade is brought close to the other).

On the other hand, if the angular position is counted with respect to the AS-side, when similar detected data, i.e., "DR=10, AS=7" is obtained, the angular position of "7" of the AS-side corresponds to a target angular distance for the DR-side of "14", which means that there is "−7" difference between the detected difference and the target distance. In the case of the detected data of "DR=10, AS=7" the actual angular distance between the AS-side and the DR-side is "−3" (7−10), the AS-side angular difference calculation means 34b carries out an arithmetic operation or ((−7)−(−3)), producing a value of "−4". This value means that the wiper blade in the DR-side is delayed by "4" pulse amount from the target angular distance, as viewed from the following wiper blade in the AS-side (i.e., the blade in the DR-side is coming closer to the other). Note that the data distribution of pulses in the leading side is coarser than that of the follower side also in the control data reference table 36, like the reference tables in FIGS. 4 and 5.

In this way, according to the third embodiment of the present invention, there is prepared a control data reference table 36c in which data indicative of the relationship between the each of the angular position and the angular distance relative to the opponent wiper blade, and the wiper blades 2a, 2b which can have the different traveling velocities are controlled based on not only their own angular position but also the angular position of the opponent wiper blade. Therefore, even if the wiper blades 2a, 2b are subject fluctuation in their angular distance due to an external load variation or the like, both of the motors 3a, 3b can vary their output in response to the load fluctuation, and hence the angular distance of the wiper blade can be brought to close to the target angular distances prepared in the target angular distance reference table, and the wiper blades 2a and 2b can be suppressed in their variation in the positional angular distance.

Figure 8:
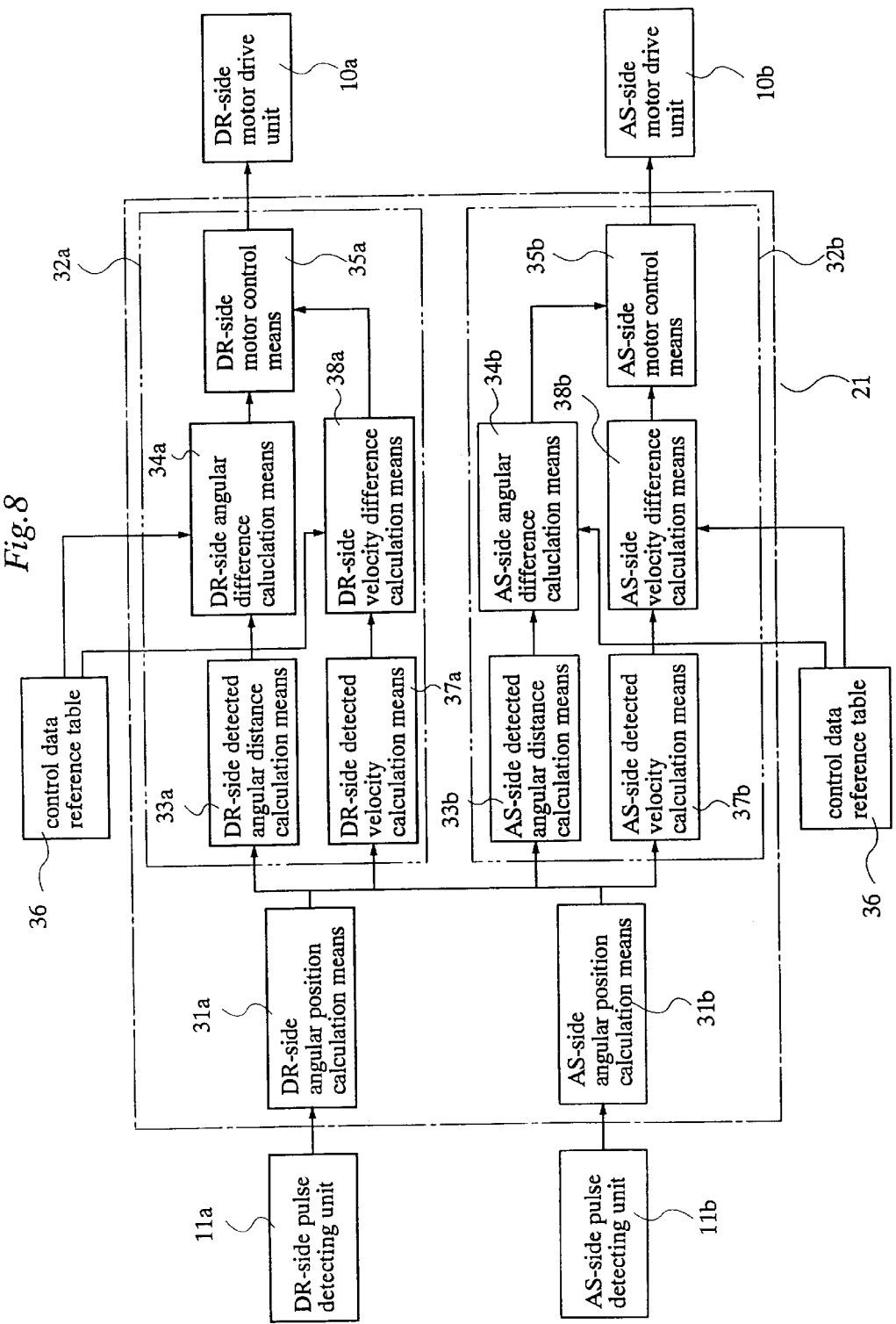
FIG. 8 is a diagram showing in a block form the function of a CPU according to the third embodiment of the present invention.

The CPU 21 carries out wiper control based on data concerning the velocities of the wiper blades 2a and 2b as well as data concerning the angular positions thereof. FIG. 8 is a block diagram showing the configuration of the main function of the CPU 21 as the third embodiment of the present invention. As shown in FIG. 8, the CPU 21 of the third embodiment includes in its the motor control means 32a and 32b, a DR-side wiper blade detected velocity calculation means 37a (or first wiper blade detected velocity calculation means) and a AS-side wiper blade detected velocity calculation means 37b (or second wiper blade detected velocity calculation means), and a DR-side velocity difference calculation means 38a (or first wiper blade detected velocity difference calculation means) and a AS-side velocity difference calculation means 38b (or first wiper blade detected velocity difference calculation means), respectively.

The DR-side and AS-side wiper blade detected velocity calculation means 37a and 37b function to calculate the actual velocities of the wiper blades 2a and 2b at present and obtain the velocities of the wiper blades 2a and 2b by taking the velocities as the times respectively required for the blades to move 1 pulse, i.e., the necessary time per pulse.

The DR-side and AS-side wiper blade detected velocity calculation means 37a and 27b are supplied with the angular positions of the wiper blades 2a and 2b from the angular position calculation means 31a and 31b. Then, the DR-side and AS-side wiper blade detected velocity calculation means 37a and 27b calculate the necessary times per pulse require for the wiper blades 2a and 2b based on the obtained angular positions and the clock count of the timer 23. Thereafter, the DR-side and AS-side wiper blade detected velocity calculation means 37a and 27b supplies these times as the detected velocities of the wiper blades 2a and 2b to the DR-side and AS-side velocity difference calculation means 38a and 38b in the next stage.

Subsequently, the DR-side and AS-side velocity difference calculation means 38a and 38b compare the detected velocities of the wiper blades with the target velocities of the wiper blades which are stored in advance in the control data reference table 36c described above. Referring to the control data reference table 36c in FIG. 4, for example, if the wiper blade in the DR-side is at "10" pulses, it is found that corresponding DR-side target velocity (or target cycle) is "3268" from the table. The set of target velocities is prepared for each of the DR-side and AS-side, and each of the target velocities is made correspondent to every possible angular position which is determined at every pulse count and thus taken by each of the DR-side and AS-side wiper blades. For example, if the DR-side wiper blade takes an angular position corresponding to "1" pulse amount, the corresponding target velocity for the DR-side wiper blade is "3617" pulse count per unit cycle. When the DR-side wiper blade travels by one pulse amount, or the wiper blade reaches the angular position of "2" pulse amount, the corresponding target velocity for the DR-side wiper blade becomes "2893", which results from addition of "3617" with "−723" in the column of added cycle. This means that the DR-side wiper blade is decelerated when it reaches the angular position of the "2" pulses amount as compared with the angular position of the 1 pulse amount. In this way, the wiper blade is accelerated or decelerated depending on the entries of the column of added cycle at every angular position.

With use of this kind of control data reference table 36c, the target velocities of the wiper blades 2a and 2b can be finely determined in correspondence with their own angular positions, respectively, so that the target velocity can be changed smoothly for every angle. Accordingly, it is possible to smoothen the output values of the motors which otherwise are generated by merely changing the target angular distances upon necessity in a discrete fashion. In addition, it is possible to realize fine velocity control in which velocities are changed while the angle distance between the DR-side wiper blade and the AS-side wiper blade is maintained constant. Further, if the external force applied on both of the wiper blades are equal and hence change is caused only on velocity but no change on distance between the wiper blades, this change on velocity is detected and feedback control can be effected on the velocity change. Therefore, the period for one cyclic motion for the wiper blades can be maintained constant.

The DR-side compared angular difference calculation means 38a compares the detected velocity with the corresponding DR-side target velocity stored in the control data reference table 36c as described above, thereby to obtain the DR-side velocity difference which is indicative of difference between the detected velocity and target velocity. That is, for example, if a value "4000" is obtained as a detected velocity of the wiper blade 2a, the DR-side velocity difference calculation means 38a prepares DR-side velocity difference of "+732" (4000−3268). On the other hand, the AS-side velocity difference calculation means 38b compares the detected velocity of the wiper blade 2b with the AS-side target velocity previously stored in the control data reference table 36c and produces AS-side velocity difference, in a similar manner.

In the rear stage of the compared angular difference calculation means 34a and 34b and the velocity difference calculation means 38a and 38b, there are provided a DR-side motor control means 35a (as a first motor control means) and a AS-side motor control means 35b (as a second motor control means) for calculating and determining the outputs for the motors 3a and 3b based on the obtained angular difference and the velocity difference data. As described above, the DR-side control means 35a and the AS-side motor control means 35b generate outputs for the motors 3a and 3b so that the difference between the detected angular distance and target angular distance and also the difference between the detected velocities and the target velocities, and supply the outputs to the motor drive units 10a and 10b, respectively. That is, also in the wiper control apparatus according to the present invention, observations are carried out not only on the difference between the detected angular distance and the target angular distance but on difference between detected velocities and the corresponding target velocities, and control is effected on the wiper blades 2a and 2b so that these differences are made small.

Similarly to the second embodiment, the DR-side motor control means 35a calculates the following formula to generate a synthesized output;

"new output=a×(target angular distance−detected angular distance)+b×(target velocity−detected velocity)

where a and b are coefficients".

As for the velocity difference, since "+732" is obtained, it is recognized that the velocity of the DR-side wiper blade is higher than the target velocity, and therefore, the output (or rotation velocity) is calculated in consideration of the angular difference described above. Further, a control signal is supplied to the DR-side motor drive unit 10a so as to realize the output.

Also, in the AS-side motor control means 35b, similarly to the manner of the second embodiment, the output for the motor in the AS-side is calculated on the basis of the angle difference and the velocity difference of the AS-side, and a control signal is supplied to the AS-side motor drive unit 10b so as to realize the output.

Thus, the wiper drive control unit 12 is provided with a set of target velocities each corresponding to every possible angular position taken by each of the blades, and controls the wiper blades 2a and 2b so that the wiper blade 2a and 2b travel with a velocity close to the target velocity corresponding to the traveling angular position. Thus, the wiper motions becomes smooth and the wiping cycle becomes stable.

Although the present embodiment has cited an example in which the target angular distances and target velocities are stored in a common control data reference table 36, it is needless to say that the target angular distances and target velocities may be stored in separate reference tables, respectively, and these reference tables may be provided in the ROM 24.

Thus, according to the third embodiment of the present invention, in addition to control for bringing the angular position distance close to the target angular distance, the target velocities for the wiper blades are set for every possible angular position and the motions of the wiper blades are controlled by comparing the detected velocities with the target velocities. Therefore, the wiper blades are controlled in a much finer way. Accordingly, if the set of target velocities is arranged for every possible angular position to realize smoother wiper motions, the wiper motion will become smoother as compared with a control based on only the angular position distances.

According to the above described embodiments, the detected angular distance between the DR-side wiper blade and the AS-side wiper blade is directly supplied to the compared angular difference calculation means 34a, 34b. However, if the detected angular distance becomes above 180° or below −180°, the wiper control will encounter the following difficulties.

Incidentally, if the wiper motion control is carried out based on the angular positions of the wiper blades which are detected in connection with the rotation angle of the motors, there can be a confusion that the angle difference can be determined by measurement in clockwise direction and measurement in counterclockwise direction. That is, when the wiper motion is controlled based on the calculation result of the position angle distance=DR-side angular position−AS-side angular position, if the position angle distance between both of the blades exceeds a half cycle, which corresponds to 180° in motor rotation angle, the greater one of angle distances, which is measured from the following side to the preceding side in counterclockwise direction, is selected and used for wiper control. For example, if "DR-side angular position=315° and the AS-side angular position=45°" as shown in FIG. 10(e), the angular position distance becomes 270° (315°−45°). This calculation result means that the wider angle $\Delta\theta 1=270°$ is calculated among the angular position distances therebetween as is apparent from FIG. 10(e). However, from the viewpoint of the motions of the wiper blades, we can regard that the AS-side precedes by an angle of 90° relative to the DR-side, That is if the wiper control is carried out directly based on the calculation result when the motor rotation angle distance as a angular position distance exceeds 180°, there is a problem that the larger angle distance s selected as the angular distance between the pair of blades and it takes a longer time to make the position angle distance to be brought close to the target angular distance.

Now explanation will hereinafter be made on a manner in which the angular position distance between the wiper blades 2a and 2b is replaced by a newly generated angular position distance and the newly generated angular position distance is utilized for comparison with the target angular distance distance. Note that in the present embodiment, the parts corresponding to those in the first to third embodiments will be attached with the same reference numerals and they will not be described.

The CPU 21 used in this case has the same structure as that of the first embodiment shown in FIG. 3. In addition, in the CPU 21, the rotation angles of the motors 3a and 3b are obtained from the pulse accumulation count and are used as angular positions x°. Based on the angles, the following processing is carried out. However, the following processing may be carried out with use of actual angular positions (deg) by previously storing the relationships between the motor rotation angles and the angular positions θa and θb (deg), in form of a reference table or the like, in the ROM 24.

If the detected angular position differences of the wiper blade of the DR-side is positioned at the angular position of "10 pulses amount (hereinafter abbreviated as p)=20" and the wiper blade of the AS-side is positioned at the angular position of "3 pulses=6", the DR-side detected angular distance (or first wiper blade detected angular distance) is "+14°" which is obtained by subtracting the angular position in the AS-side from the angular position in the DR-side (20°–6°). Meanwhile, the AS-side detected angular distance as viewed from the AS-side (or second wiper blade measurement angle distance) is "−14°" which is obtained by subtracting the angular position in the DR-side from the angular position in the AS-side (6°–20°).

If the distance between the detected angular position of the DR-side wiper blade and the detected angular position of the AS-side wiper blade exceeds an half cycle, or 180° in terms of the motor rotation angle, the operation for recovery to reduce the difference will be delayed because of the reason described above. For this reason, the detected angular distance is corrected or replaced by a newly generated angular distance value in a manner described as follows. Note that the same processing is applied on both the DR-side and the AS-side, and thus only a case in which the correction is carried out on the DR-side will be explained.

Figure 9:
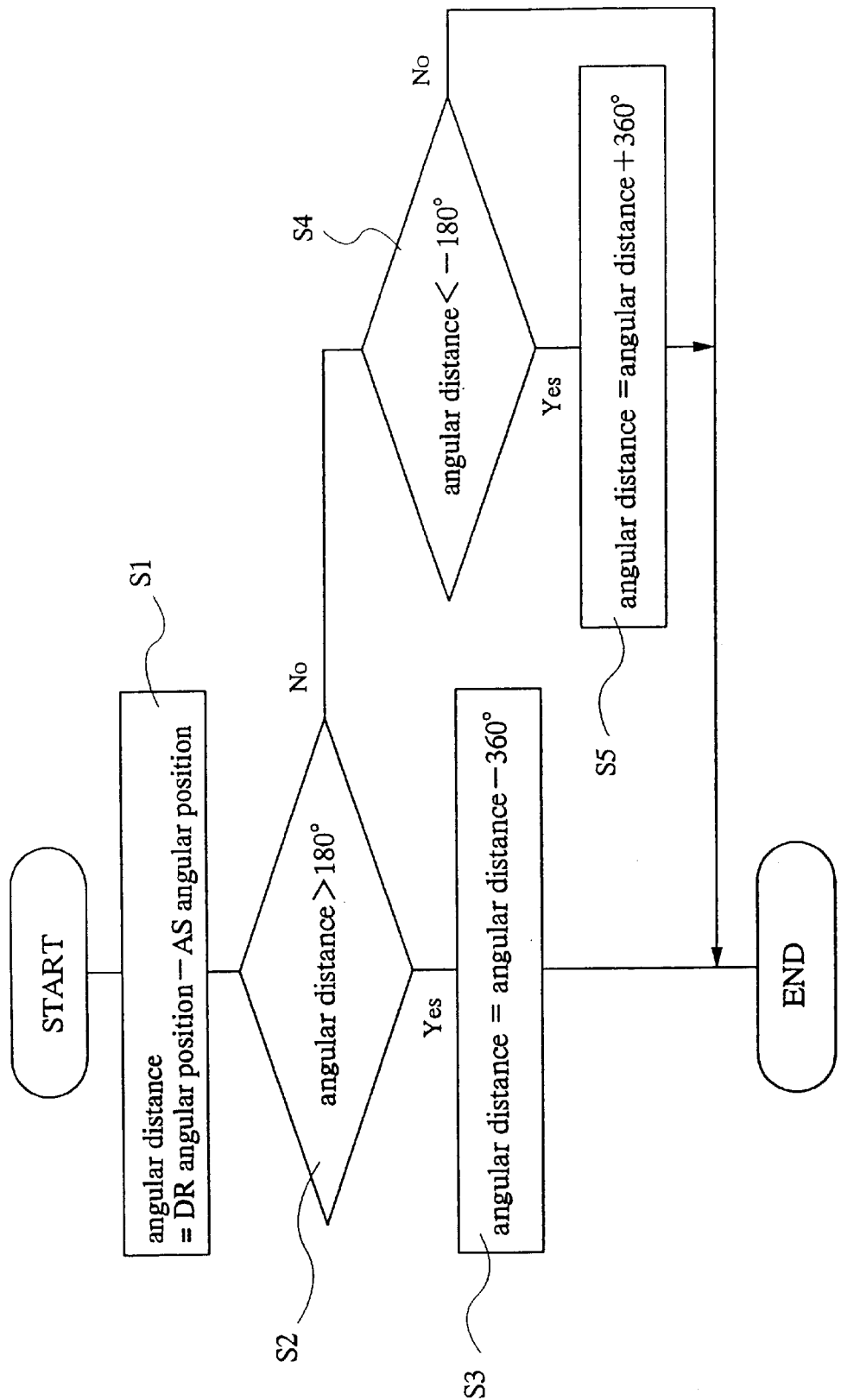
FIG. 9 is a flowchart showing the process for correcting angular position of one wiper blade relative to that of the other.
Figure 11:
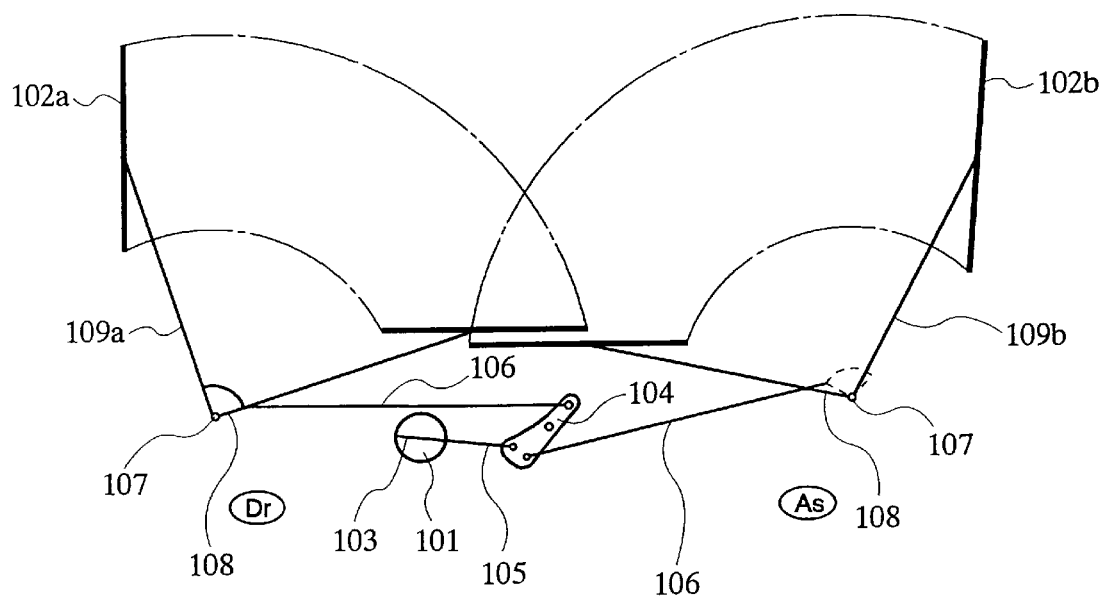
FIG. 11 is a schematic illustration of a conventional wiper apparatus in which a pair of wiper blades are driven in an opposing fashion by a single motor.
Figure 12:
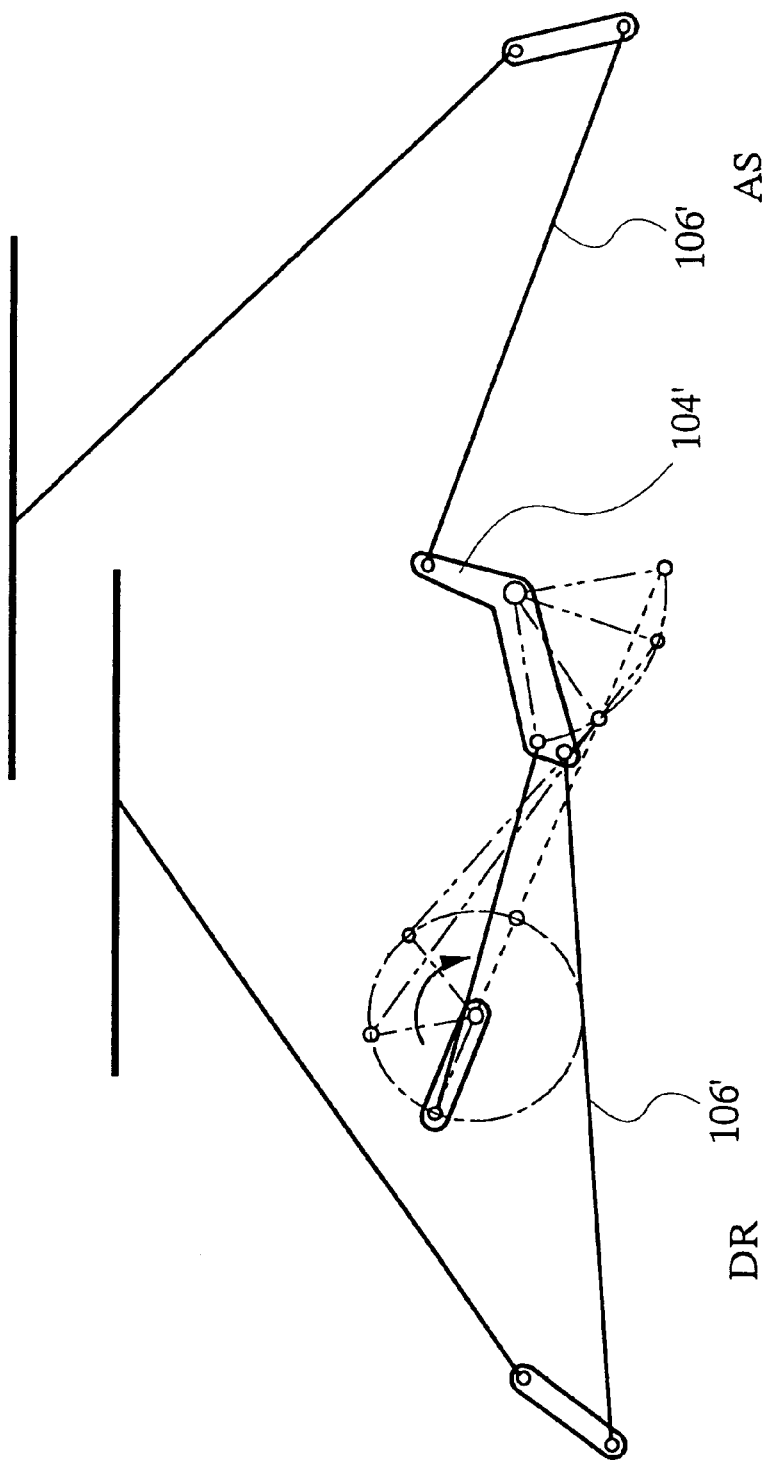
FIG. 12 is a schematic illustration of another conventional wiper apparatus in which a pair of wiper blades are driven by a single motor by way of an unbalanced link mechanism.

FIG. 9 is a flowchart showing a procedure for generating the new DR-side detected distance for replacing the DR-side detected angular distance. FIG. 10 is a set of diagrams useful for explaining positional relationships between wiper blades 2a and 2b. FIG. 10(a) shows a state where the blade in the DR-side is situated more ahead by 90° than the blade in the AS-side (DR=135°, AS=45°). FIG. 10(b) shows a state where the blade in the DR-side is situated more ahead by 225° than the blade in the AS-side (DR=270°, AS=45°). FIG. 10(c) shows a state where the blade in the AS-side is situated more ahead by 90° than the blade in the DR-side (DR=45°, AS=135°). FIG. 10(d) shows a state where the blade in the AS-side is situated more ahead by 225° than the blade in the DR-side (DR=45°AS=270°).

In FIG. 9, an actual angle distance is obtained in a step S1 at first. Next, it is determined whether the obtained angle distance exceeds an half cycle or not in a step S2. That is, one revolution of the motors 3a and 3b corresponds to one wiping cycle, and therefore, it is determined whether the obtained angle distance exceeds 180° or not. If the obtained angle distance exceeds 180°, in a step S3, an angle equivalent to one cycle which is 360° is subtracted from the angle distance obtained in the step S1 to correct the detected angular distance and the corrected distance is configured as DR-side detected angular difference. This routine is then terminated.

To see the above from FIG. 10(b), this figure shows DR−AS=225° and the processing therefore goes to the step S3 from the step S2 so that the DR-side detected angular distance becomes 225°−360°=−135°. Specifically, in the case of FIG. 10(b), the smaller one (which includes 0°) is selected among angle distances between both sides, and DR-side detected angular difference representing that the wiper blade in the DR-side moves more ahead by −135° than (or is delayed by 135°) that in the AS-side is calculated out.

Meanwhile, if it is determined that the angle distance does not exceed 180° in the step S2, further determination is made in a step S4 as to whether or not the angle distance is smaller than −180°. If the angle distance is smaller than 180°, the processing goes to a step S5 and 360° is added to the angle distance. This is taken as DR-side detected angular distance and the routine is then terminated Accordingly, in the case of FIG. 10(d), since DR−AS=−225° exists, the processing goes to the step S5 from the step S4, and the DR-side detected angular distance is −225°+360°=+135°. That is, also in the case of FIG. 10(d), the smaller angle distance including 0° is selected among both angle distances, and DR-side detected angular difference representing that the wiper blade in the DR-side moves more ahead by 135° than that in the AS-side is calculated out.

Otherwise, if it is determined that the angle distance is equal to or larger than −180°, the detected angular distance calculated in the step Si is directly taken as DR-side measure angular difference and the routine is terminated. Therefore, since DR−AS=90° exists in FIG. 10(a), the processing goes from the step S2 to the step S4 to the step S4 to END, and DR-side detected angular difference representing that the wiper blade in the DR-side moves more ahead by 90° than that in the AS-side is calculated out as just indicated by the detected angular distance. Also, in the case of FIG. 10(c), the processing goes from the step S2 to the step S3 to the step S4 to END since DR−AS=−90° exists, and DR-side detected angular difference representing that the wiper blade in the DR-side moves more ahead by −90° than (or is delayed by 90° from) that in the AS-side is calculated out as just indicated by the detected angular distance.

Thus, according to the wiper control apparatus, when the angular position distance between both the wiper blades 2a and 2b exceeds 180°, the smaller angular position distance is selected as detected angular difference. Therefore, the angular position distance between both the wiper blades 2a and 2b can be more smoothly converged to an angle distance as a target, compared with a case of using the other larger angle distance.

Next, in the rear stages of the detected angular distance calculation means 33a and 33a, respectively, there are provided a DR-side angular difference calculation means 34a (as a first wiper blade angular difference calculation means) and a AS-side angular difference calculation means (as a second wiper blade angular difference calculation means), respectively, as described above with reference to FIG. 3. In addition, the target angular distance as a comparative object is read from each of a DR-side target distance reference table 36a and a AS-side target angular distance reference table 36b stored previously in the ROM 24. (See FIGS. 4 and 5.)

In this case, from the control data reference table 36a in FIG. 4, for example, it is found that the angular position in the AS-side is "5p=10°" when the angular position in the DR-side is "10p=20°", and the target angular distance between both of the blades is "+10°". Therefore, for example, if position data indicating a detected angular distance of "+6°" has been obtained where "DR=20°, AS=7°" exists as in the above example, the DR-side angular difference calculation means 34a calculates DR-side angular difference (or first wiper blade angular difference) of "+4°" ((+10°)−(+6°)) with respect to the target angular distance. This data indicates a state that the wiper blade in the AS-side travels more ahead by "2" pulses than the target angular distance, viewed from the leading DR-side wiper blade (i.e., the blade in the AS-side is coming closer to the other).

In contrast, in the AS-side target angular distance reference table 36c in FIG. 5, the angular position target in the DR-side is "14p=28°" when the angular position in the AS-side is "7p=14°" and the target angular distance between both sides is "−14°" in the above example (where "DR=20°, AS=7°" exists). In this respect, since the value of the detected angular difference is "−6°" (14°−20°) in the above example, the AS-side angular difference calculation means 34b calculates AS-side angular difference (or second wiper blade angular difference) of "−8°" ((−14°)−(−6°)) with respect to the target angular distance. This data indicates a state that the wiper blade in the DR-side is delayed by "8°" from the target angular distance, viewed from the following wiper blade in the AS-side (i.e., the blade in the DR-side is coming closer to the other).

Meanwhile, the DR-side motor control means 35a and the AS-side motor control means 35b calculate respectively such outputs of the motors 3a and 3b that reduce the difference between the target angular distance and the detected angular distance, based on the angular difference described above and instruct the outputs to the motor drive units 10a and 10b.

Specifically, according to the example described above, the DR-side motor control means 35a obtains a value "+4°" as DR-side angular difference and recognizes therefrom that the wiper blade in the AS-side is closer by "4°" than the target value. Further, a higher output (or rotation velocity) than at present is calculated for the DR-side in order that the angular position distance is widened to approach the target value, and a control signal is supplied to the DR-side motor drive unit 10a, to realize this output.

In the AS-side motor control means 35b, according to the example described above, the means 35b obtains a value "−8°" as AS-side angular difference and recognizes therefrom that the wiper blade in the DR-side is closer by "8°" than the target value. Further, a lower output (or rotation velocity) than at present is calculated for the AS-side in order that the angular position distance is widened to approach the target value, and a control signal is supplied to the AS-side motor drive unit 10b, to realize this output.

Although the present embodiment has cited an example in which the rotation angles of the motors 3a and 3b are taken as the angular positions of the wiper blades 2a and 2b and the calculated detected angular position distance is corrected by adding thereto or subtracting therefrom 360°, the value may be corrected by adding or subtracting the driving angle corresponding to one cycle, with respect to the angles θa and θb from the lower return positions of the wiper blade 2a and 2b.

Thus, according to the fourth embodiment, when the angular position distance between both the wiper blades 2a and 2b exceeds an half cycle which corresponds to 180° in form of a motor rotation angle, the angular position distance between both wiper blades is controlled by correcting the angular position distance by one cycle which is 360° expressed in form of a motor rotation angle. In this case, wiper control can be performed with using the smaller angular position distance. Therefore, the angular position distance between both wiper blades can be much more smoothly converged to an angle distance as a target.

Detailed description has hereinabove been given of the invention achieved by the present inventor with reference to the embodiment. However, the present invention should not be limited to the embodiment described above, and various modification can be effected without departing from the gist of the invention, and all such variations shall be embraced within the scope of the invention.

What is claimed is:

1. A method for controlling an opposed wiping type wiper apparatus having a pair of wiper blades arranged to move in opposing fashion, comprising the steps of:

preparing a set of target angular distances each corresponding to every possible angular position taken by one of the wiper blades;

detecting an angular position of the one wiper blade and an angular position of the opponent wiper blade;

calculating the angular distance of the one wiper blade relative to the opponent wiper blade;

controlling the one wiper blade so that the angular position of the one wiper blade is brought close to the corresponding target angular distance.

2. A method according to claim 1, wherein the wiping motion of the pair of wiper blades is arranged to be a cyclic motion with a period and when the detected angular distance exceeds half the period, the detected angular distance is replaced by a newly generated angular distance that is corrected by one complete period.

3. A method for controlling an opposed wiping type wiper apparatus having a first wiper blade and a second wiper blade driven by respective driving means, comprising the steps of:

preparing a first set of target angular distances of the first wiper blade relative to the second wiper blade, each target angular distance corresponding to every possible angular position taken by the first wiper blade;

preparing a second set of target angular distances of the second wiper blade relative to the first wiper blade, each angle difference corresponding to every possible angular position taken by the second wiper blade;

detecting an angular position of the first wiper blade and an angular position of the second wiper blade;

calculating the angle difference of the first wiper blade relative to the second wiper blade and the angle difference of the second wiper blade relative to the first wiper blade;

controlling the first and second wiper blades so that the angle difference of the first wiper blade is brought close to the corresponding target angular distance of the first wiper blade while the angle difference of the second wiper blade is brought close to the corresponding target angular distance of the second wiper blade.

4. A method according to claim 3, wherein the wiping motion of the wiper blades is arranged to be a cyclic motion with a period and when the detected angular distance exceeds half the period, the detected angular distance is replaced by a newly generated angular distance that is corrected by one complete period.

5. A method for controlling an opposed wiping type wiper apparatus having a first wiper blade and a second wiper blade driven by respective driving means, comprising the steps of:

preparing a first set of target angular distances of the first wiper blade relative to the second wiper blade, each target angular distance corresponding to every possible angular position taken by the first wiper blade;

preparing a second set of target angular distances of the second wiper blade relative to the first wiper blade, each target angular distance corresponding to every possible angular position taken by the second wiper blade;

detecting an angular position of the first wiper blade and an angular position of the second wiper blade;

calculating the angular distance of the first wiper blade relative to the second wiper blade and the angular distance of the second wiper blade relative to the first wiper blade;

detecting a traveling velocity of the first wiper blade and a traveling velocity of the second wiper blade;

calculating the average traveling velocity of the first wiper blade and the average traveling velocity of the second wiper blade;

controlling the first and second wiper blades so that the angular distance of the first wiper blade is brought close to the corresponding target angular distance of the first wiper blade and the traveling velocity of the first wiper blade is brought close to the average traveling velocity of the first wiper blade while the angular distance of the second wiper blade is brought close to the corresponding target angular distance of the second wiper blade and the traveling velocity of the second wiper blade is brought close to the average traveling velocity of the second wiper blade.

6. A method according to claim 5, wherein the wiping motion of the wiper blades is arranged to be a cyclic motion with a period and when the detected angular distance exceeds half the period, the detected angular distance is replaced by a newly generated angular distance that is corrected by one complete period.

7. A method for controlling an opposed wiping type wiper apparatus having a first wiper blade and a second wiper blade driven by respective driving means, comprising the steps of:

preparing a first set of target angular distances of the first wiper blade relative to the second wiper blade, each angular distance corresponding to every possible angular position taken by the first wiper blade;

preparing a second set of target angular distances of the second wiper blade relative to the first wiper blade, each angular distance corresponding to every possible angular position taken by the second wiper blade;

detecting an angular position of the first wiper blade and an angular position of the second wiper blade;

calculating the angular distance of the first wiper blade relative to the second wiper blade and the angular distance of the second wiper blade relative to the first wiper blade;

preparing a first set of target traveling velocities of the first wiper blade, each velocity corresponding to every possible angular position taken by the first wiper blade;

preparing a second set of target traveling velocities of the second wiper blade, each velocity corresponding to every possible angular position taken by the second wiper blade;

detecting a traveling velocity of the first wiper blade and a traveling velocity of the second wiper blade;

controlling the first and second wiper blades so that the detected angular distance of the first wiper blade is brought close to the corresponding target angular distance of the first wiper blade and the detected traveling velocity of the first wiper blade is brought close to the target traveling velocity of the first wiper blade while the detected angular distance of the second wiper blade is brought close to the corresponding target angular distance of the second wiper blade and the detected traveling velocity of the second wiper blade is brought close to the target traveling velocity of the second wiper blade.

8. A method according to claim 7, wherein the wiping motion of the wiper blades is arranged to be a cyclic motion with a period and when the detected angular distance exceed half the period, the detected angular distance is replaced by a newly generated angular distance that is corrected by one complete period.

9. An opposed wiping type wiper apparatus having a pair of wiper blades arranged to move in opposing fashion, comprising:

detecting means for detecting an angular position of one wiper blade and an angular position of the opponent wiper blade;

calculating means for calculating the angular position distance of the one wiper blade relative to the opponent wiper blade;

memory means for setting therein a set of target distances each corresponding to every possible angular position taken by one wiper blade;

control means for controlling the one wiper blade so that the angular position of the one wiper blade is brought close to the corresponding target angular distance.

10. An apparatus according to claim 9, wherein the wiping motion of the pair of wiper blades is arranged to be a cyclic motion with a period and when the calculated angular distance exceeds half the period, the detected angular distance is replaced by a newly generated angular distance that is corrected by one complete period.

11. An opposed wiping type wiper apparatus having a first wiper blade and a second wiper blade driven by respective driving means, comprising:

detecting means for detecting an angular position of the first wiper blade and an angular position of the second wiper blade;

calculating means for calculating the angular distance of the first wiper blade relative to the second wiper blade and the angular distance of the second wiper blade relative to the first wiper blade;

first memory means for setting therein a first set of target angular distances of the first wiper blade relative to the second wiper blade, each angular distance corresponding to every possible angular position taken by the first wiper blade;

second memory means for setting therein a second set of target angular distances of the second wiper blade relative to the first wiper blade, each angular distance corresponding to every possible angular position taken by the second wiper blade;

control means for controlling the first and second wiper blades so that the angular distance of the first wiper blade is brought close to the corresponding target angular distance of the first wiper blade while the angular distance of the second wiper blade is brought close to the corresponding target angular distance of the second wiper blade.

12. An apparatus according to claim 11, wherein the wiping motion of the wiper blades is arranged to be a cyclic motion with a period and when the detected angular distance exceeds half the period, the detected angular distance is replaced by a newly generated angular distance that is corrected by one complete period.

13. An opposed wiping type wiper apparatus having a first wiper blade and a second wiper blade driven by respective driving means, comprising:

first detecting means for detecting an angular position of the first wiper blade and an angular position of the second wiper blade;

first calculating means for calculating the angular distance of the first wiper blade relative to the second wiper blade and the angular distance of the second wiper blade relative to the first wiper blade;

first memory means for setting therein a first set of target angular distances of the first wiper blade relative to the second wiper blade, each angular distance corresponding to every possible angular position taken by the first wiper blade;

second memory means for setting therein a second set of target angular distances of the second wiper blade relative to the first wiper blade, each angular distance corresponding to every possible angular position taken by the second wiper blade;

second detecting means for detecting a traveling velocity of the first wiper blade and a traveling velocity of the second wiper blade;

second calculating means for calculating the average traveling velocity of the first wiper blade and the average traveling velocity of the second wiper blade;

control means for controlling the first and second wiper blades so that the angular distance of the first wiper blade is brought close to the corresponding target angular distance of the first wiper blade and the traveling velocity of the first wiper blade is brought close to the average traveling velocity of the first wiper blade while the angular distance of the second wiper blade is brought close to the corresponding target angular distance of the second wiper blade and the traveling velocity of the second wiper blade is brought close to the average traveling velocity of the second wiper blade.

14. An apparatus according to claim 13, wherein the wiping motion of the wiper blades is arranged to be a cyclic motion with a period and when the detected angular distance exceeds half the period, the detected angular distance is replaced by a newly generated angular distance that is corrected by one complete period.

15. An opposed wiping type wiper apparatus having a first wiper blade and a second wiper blade driven by respective driving means, comprising:

first detecting means for detecting an angular position of the first wiper blade and an angular position the second wiper blade;

first calculating means for calculating the angular distance of the first wiper blade relative to the second wiper blade and the angular distance of the second wiper blade relative to the first wiper blade;

first memory means for setting therein a first set of target angular distances of the first wiper blade relative to the second wiper blade, each angular distance corresponding to every possible angular position taken by the first wiper blade;

second memory means for setting therein a second set of target angular distances of the second wiper blade relative to the first wiper blade, each angular distance corresponding to every possible angular position taken by the second wiper blade relative to the first wiper blade;

second detecting means for detecting a traveling velocity of the first wiper blade and a traveling velocity of the second wiper blade;

third memory means for setting a first set of target velocities for the first wiper blade, each velocity corresponding to every possible angular position taken by the first wiper blade;

fourth memory means for setting a second set of target velocities for the second wiper blade, each velocity corresponding to every possible angular position taken by the second wiper blade;

control means for controlling the first and second wiper blades so that the angular distance of the first wiper blade is brought close to the corresponding target angular distance of the first wiper blade and the traveling velocity of the first wiper blade is brought close to the target traveling velocity of the first wiper blade while the angular distance of the second wiper blade is brought close to the corresponding target angular distance of the second wiper blade and the traveling velocity of the second wiper blade is brought close to the target traveling velocity of the second wiper blade.

16. An apparatus according to claim 15, wherein the wiping motion of the wiper blades is arranged to be a cyclic motion with a period and when the detected angular distance exceeds half the period, the detected angular distance is replaced by a newly generated angular distance that is corrected by one complete period.

* * * * *

UNITED STATES PATENT AND TRADEMARK OFFICE
CERTIFICATE OF CORRECTION

PATENT NO. : 6,107,766
DATED : August 22, 2000
INVENTOR(S) : Toshiyuki Amagasa

Page 1 of 1

It is certified that error appears in the above-identified patent and that said Letters Patent is hereby corrected as shown below:

<u>Claim 15, column 27,</u>
Line 27, after "position" please insert -- of --.

Signed and Sealed this

Fourth Day of September, 2001

*Attest:*

*Attesting Officer*

NICHOLAS P. GODICI
*Acting Director of the United States Patent and Trademark Office*